United States Patent
Chang et al.

(10) Patent No.: US 11,961,514 B1
(45) Date of Patent: Apr. 16, 2024

(54) STREAMING SELF-ATTENTION IN A NEURAL NETWORK

(71) Applicant: Amazon Technologies, Inc., Seattle, WA (US)

(72) Inventors: Chia-Jung Chang, Cambridge, MA (US); Qingming Tang, Cambridge, MA (US); Ming Sun, Winchester, MA (US); Chao Wang, Newton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 313 days.

(21) Appl. No.: 17/547,610

(22) Filed: Dec. 10, 2021

(51) Int. Cl.
*G10L 15/16* (2006.01)
*G10L 15/14* (2006.01)
*G10L 17/16* (2013.01)

(52) U.S. Cl.
CPC .................................. *G10L 15/16* (2013.01)

(58) Field of Classification Search
CPC ....... G10L 15/16; G10L 15/14; G10L 15/142; G10L 15/144; G10L 17/16
USPC ........................................... 704/256.1, 256.5
See application file for complete search history.

(56) References Cited

U.S. PATENT DOCUMENTS 11,042,700 B1 * 6/2021 Walters .................. G06N 20/00

\* cited by examiner

*Primary Examiner* — George C Monikang
(74) *Attorney, Agent, or Firm* — Pierce Atwood LLP

(57) ABSTRACT

An acoustic event detection system may employ one or more recurrent neural networks (RNNs) to extract features from audio data, and use the extracted features to determine the presence of an acoustic event. The system may use self-attention to emphasize features extracted from portions of audio data that may include features more useful for detecting acoustic events. The system may perform self-attention in an iterative manner to reduce the amount of memory used to store hidden states of the RNN while processing successive portions of the audio data. The system may process the portions of the audio data using the RNN to generate a hidden state for each portion. The system may calculate an interim embedding for each hidden state. An interim embedding calculated for the last hidden state may be normalized to determine a final embedding representing features extracted from the input data by the RNN.

20 Claims, 15 Drawing Sheets

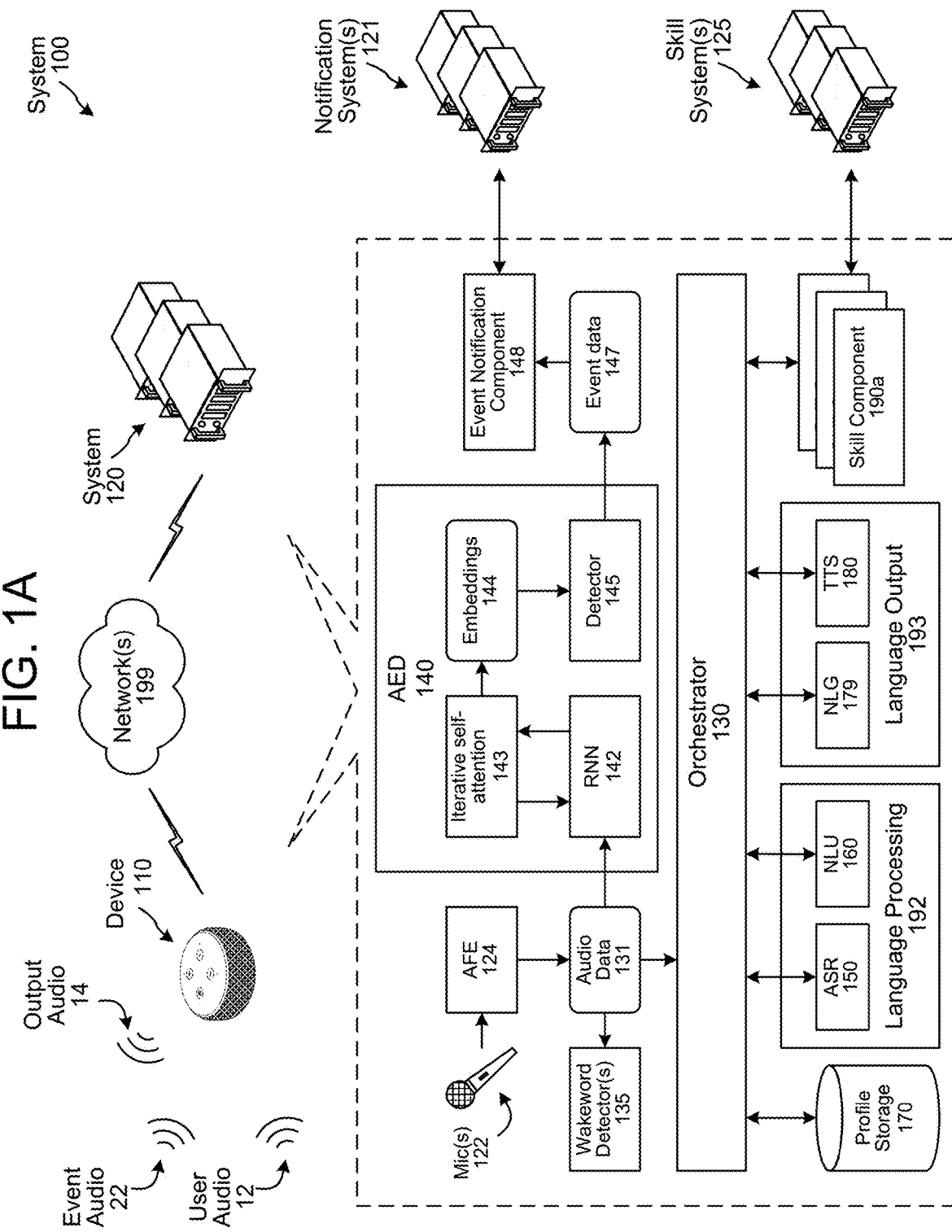

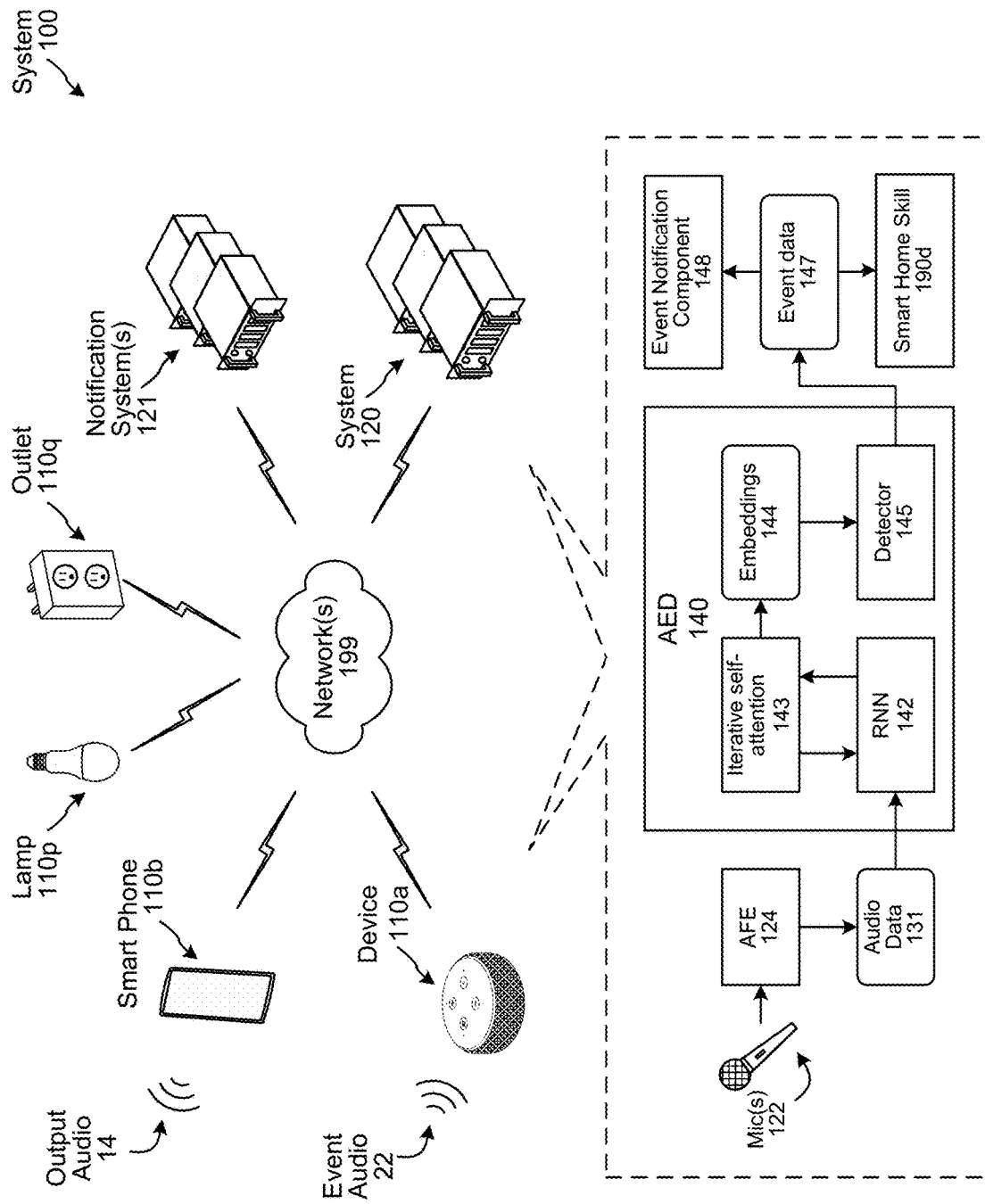

STREAMING SELF-ATTENTION IN A NEURAL NETWORK

BACKGROUND

Computer systems may employ machine learning algorithms to perform tasks that may involve recognizing patterns and/or sequences in data and making inferences and/or predictions. Example applications of machine learning algorithms include acoustic event detection (AED) and/or speech recognition in audio data, object and/or facial recognition in image data, etc.

BRIEF DESCRIPTION OF DRAWINGS

For a more complete understanding of the present disclosure, reference is now made to the following description taken in conjunction with the accompanying drawings.

FIG. 1A illustrates a system configured to detect an acoustic event using streaming self-attention in a neural network, according to embodiments of the present disclosure.

FIG. 1B illustrates a system configured to detect an acoustic event in a smart home environment, according to embodiments of the present disclosure.

DETAILED DESCRIPTION

Figure 2:
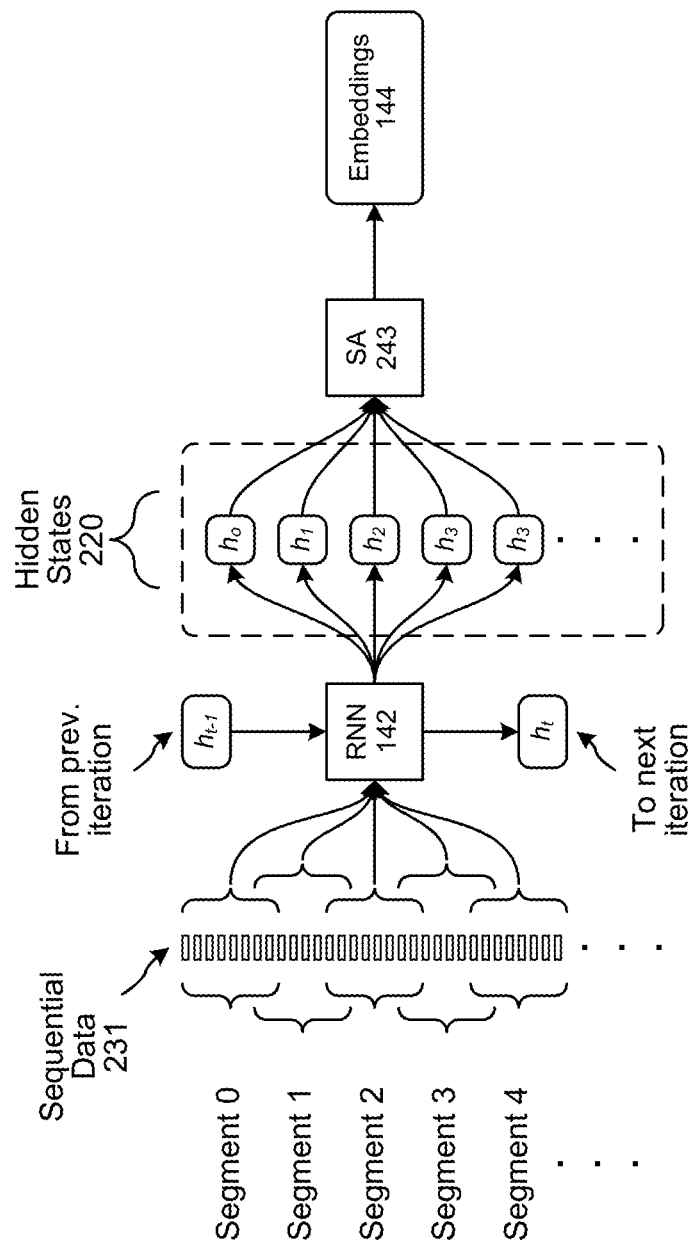
FIG. 2 illustrates using non-streaming self-attention to generate embeddings representing sequential data, according to embodiments of the present disclosure.

AED, as referred to herein, includes a use of computer science, such as artificial intelligence, that relates to processing audio data representing a sound, such as a non-speech sound, to determine when and if a particular acoustic event is represented in the audio data. Automatic speech recognition (ASR) includes transforming audio data representing speech into text or other type of data representing the words (in one or more human-understandable languages) in that speech. Natural language understanding (NLU) includes enabling computers to derive meaning from the words, such as those typed by a user and/or represented in ASR's output data. Natural language generation (NLG) includes enabling computers to generate output text or other data in words a human can understand, such as sentences or phrases. Text-to-speech (TTS) is a field of computer science, artificial intelligence, and linguistics that relates to enabling computers to convert a representation of NLG output data, user provided data, or other data into audio representing synthesized speech. Neural machine translation (NMT) includes enabling computers to receive an input in one language (e.g., as text in English) and generate an output in a second language (text in Spanish), which has the same/similar semantic meaning as the input. These technologies and others may be used together as part of a natural-understanding system. In various embodiments, the natural-understanding system may process data associated with an acoustic event (e.g., audio data that includes a representation of the event and/or event data generated by the AED system) and/or speech data associated with the event and may determine a corresponding output (e.g., sending a notification to a user device).

A user device and/or a remote system may be configured to process audio data to determine if properties of the audio data correspond to properties associated with an acoustic event. An acoustic event may be an event identified in the presence of an acoustic background (e.g., background noise) represented in audio data. Example acoustic events include a doorbell ringing, a microwave oven beeping, a baby crying, a dog barking, and/or a window pane breaking, as distinguished from uneventful background noise such as wind, traffic, HVAC equipment, etc. The user device may process the audio data in groups of samples, known as frames of audio data, to extract audio features from the audio data as it is received. The audio features may include, for example, Mel-frequency cepstrum coefficients of the audio data frames. An AED component may then process the audio features, which may be represented by a vector of N floating-point numbers. Example AED components may include a neural network configured as a hidden Markov model (HMM), support vector machine (SVM), and/or an audio feature encoder.

An audio feature encoder may include a neural network configured to extract features from the audio data to generate embeddings. A detector component may receive the embeddings and compare them to one or more stored acoustic event signatures representing target events. Embeddings may be generated for a block of audio data; for example, a 10-second audio clip. Self-attention can be applied in neural network architecture(s) for AED, among other things, to emphasize certain portions of an input over others—for example, to highlight more relevant time steps—in order to better extract features for embedding. For example, if an audio clip includes a sound of breaking glass at the beginning followed by indistinct silence or noise, a self-attention mechanism will increase the representation of features from the beginning time steps in the embeddings. The self-attention mechanism may require a significant memory allocation for storing hidden states of the neural network. Thus, implementing self-attention on a small device such as user device, or implementing self-attention for many inputs, may create technical challenges.

Offered are systems and methods for, among other things, reducing memory consumption for self-attention in a neural network. Rather than or in addition to storing all hidden states for a sequence of data, a variable may be iteratively updated after processing a portion of the block of audio data.

An interim embedding may be calculated for a portion of audio data as well. Once a variable and/or interim embedding have been calculated for a portion of the audio data, the hidden state need not be retained (although it can be retained if desired or needed for another use case, such as redundancy, training, historical, etc.). When variables and/or embeddings have been calculated for the entire sequence, the last interim embedding may be normalized to determine a final embedding that represents features extracted from the sequence the sequence.

Although illustrated for implementing self-attention in the context of acoustic event detection, the systems and methods described herein can be applied to other operations performed by an RNN over portions of input data (e.g., storing hidden states, performing pooling operations, etc.) and/or other sequential data (e.g., determining semantics of a sentence or translating a sentence, etc.).

FIG. 1A illustrates a system 100 configured to detect an acoustic event using streaming self-attention in a neural network, according to embodiments of the present disclosure. The system 100 may include a device 110 such as a voice-controlled user device, which may be in communication with one or more systems 120 over one or more computer networks 199. The systems 120 may be in close proximity to the device 110 (e.g., in the same room, building, complex, etc.) or may be remote from the device 110 (e.g., in a datacenter and/or otherwise implemented "in the cloud"). In some implementations, the device 110 and/or system 120 may interface with one or more notification systems 121 and/or skill support systems 125, which may provide additional capabilities to the system 100. The device 110, system 120, notification system 121, and/or skill support systems 125 may include similar or different hardware and/or software. Various examples of devices/system features are described in additional detail below with reference to FIGS. 11 to 13.

The system 100 may include various components as illustrated in FIG. 1A. The components may reside in the device 110 and/or system 120 such that various functionality described herein may be performed by the device 110, the system 120, or may be divided or shared between the two. For example, in some cases, the device 110 may process audio data locally, whereas in other cases the device 110 may send audio data to the system 120 for processing. Certain capabilities of the system 100 may be performed by "skills," whose functions may be performed by a skill component 190 and possibly in cooperation with a skill support system 125. Some skill components 190 may reside on the device 110 (e.g., "device skills") while other skill components 190 may reside on the system 120. Performing certain processing and actions on the device 110 (e.g., without sending audio data off device) may increase privacy and/or security of the user's data.

The system 100 may include components for performing audio event detection (AED) and/or generating notifications to a user. An audio capture component(s), such as a microphone or array of microphones 122 of the device 110, may capture input audio 12/22 and create a corresponding audio signal. An acoustic front end (AFE) 124 may process the microphone data using a number of techniques, such as determining frequency-domain audio data by using a transform such as an FFT and/or determining a Mel-cepstrum. The output of the AFE 124 may be or include acoustic feature data corresponding to a representation of the input audio data 131. The AFE 124 may process the audio signal to create acoustic feature data, which may include one or more acoustic-feature vectors such as LFBE vectors. Other types of feature vectors may be similarly created and used; for example, the feature vectors may include Mel-frequency cepstrum coefficients (MFCCs).

The AFE 124 may include an analysis filterbank that processes one or more frames audio data. The audio data may be a digital representation of an analog audio signal, which may represent an utterance and/or an acoustic event. The analysis filterbank may include hardware, software, and/or firmware for converting the time-domain audio data of the audio data into frequency-domain audio data. This conversion may be performed by implementing a Fourier transform algorithm, such as a fast Fourier transform (FFT) or discrete-time Fourier transform (DTFT). The analysis filterbank may further include two or more filters for separating the frequency range of the resultant frequency-domain audio data into two or more frequency ranges or bins. For example, the analysis filterbank may separate a frequency range of 20 Hz-20 kHz into 20 bins. The analysis filterbank may thus output M frequency ranges, wherein M may equal 20.

An energy estimation component may receive as input the frequency data, process it to determine one or more values that represent an estimated energy of the frequency data, and output corresponding acoustic feature data for each audio frame. If M acoustic features are extracted, the acoustic feature data may include one or more acoustic feature vectors of size M. The energy estimation component may include one or more filters that, given the frequency data, determine one or more magnitudes of audio energy for each bin of frequency data. These magnitudes may be represented by one or more integer and/or fixed-point values of the acoustic feature vector. The energy estimation component may determine the magnitudes by, for example, averaging the frequency data or performing a root-mean-square operation on the frequency data. The energy estimation component may, prior to processing the frequency data, convert the frequency data from a first frequency format (e.g., Hertz) to a second frequency format (e.g., Mel). The energy estimation component may then perform a logarithm operation to determine the log-filterbank energies (LFBEs) of each bin. The acoustic feature data may thus include one or more LFBE vectors. In other embodiments, the energy estimation component may perform a linear cosine transform on the logarithm of the frequency data to determine Mel-frequency cepstrum coefficients (MFCC), which may instead or in addition be represented by the acoustic feature data. The dimension of each acoustic feature vector of the acoustic feature data (which may be 20) may correspond to the number M of frequency bins (which may be 20).

The user device may include one or more AED components 140. The AED component 140 may receive the audio data 131 from the AFE 124. This audio data may be a digital representation of an analog audio signal and may be sampled at, for example, 256 kHz. The AED component 140 may instead or in addition receive acoustic feature data, which may include one or more LFBE and/or MFCC vectors, from the acoustic front end 124 as described above. The audio data 131 may include frames, where each frame may represent audio data or audio features for segment of audio data; for example, 30 ms. The AED component 140 may process the audio data 131 in blocks; for example, where a block represents 1s, 3s, 5s, 10s, or some other duration of audio. In some implementations, the acoustic front end 124 for the AED component 140 may differ from the AFE component 124 for a wakeword detector 135 at least because the AED component 140 may require a context window greater in size that that of the wakeword detector 135 (e.g., to process a larger block of audio data). For example, the wakeword acoustic-feature data may correspond to three seconds of audio data, while the AED acoustic-feature data may correspond to ten seconds of audio data.

The AED component 140 may include a recurrent neural network (RNN) 142 that processes the audio data 131 to extract embeddings 144, which may represent acoustic feature data of the audio data 131. The RNN 142 may include various neural network architectures including convolutional neural networks, long short-term memory neural networks, or combinations thereof such as exists in a convolutional neural network. The RNN 142 may include one or more recurrent layer(s) that may act as an encoder to process the audio data 131 to determine one or more probabilities that the audio data 131 includes one or more representations of one or more acoustic events. The recurrent layer(s) may include a number of nodes arraigned in one or more layers. Each node may be a computational unit that has one or more weighted input connections, a transfer function that combines the inputs in some way, and an output connection. The recurrent layer(s) may include one or more recurrent nodes, such as LSTM nodes, or other recurrent nodes, such as gated rectified unit (GRU) nodes. For example, the recurrent layer(s) may include 128 LSTM nodes; each LSTM node may receive one feature vector of the acoustic feature data during each frame. For next frames, the recurrent layer(s) may receive different sets of 128 feature vectors (which may have one or more feature vectors in common with previously received sets of feature vectors—e.g., the sets may overlap). The recurrent layer(s) may periodically reset every, for example, 10 seconds. A state of the RNN 142 may be reset when a time of running the RNN 142 (e.g., a span of time spent processing audio data) is greater than a threshold time. Resetting of the recurrent layer(s) may ensure that the recurrent layer(s) does not deviate from the state to which it had been trained. Resetting the recurrent layer(s) may include reading values for nodes of the model—e.g., weights—from a computer memory and writing the values to the recurrent layer(s).

Recurrent layer(s) may be trained using ML techniques and training data. The training data may include audio samples of acoustic events under different conditions. The training data may further include representations of other events and annotation data indicating which events are of interest and which events are not of interest. The recurrent layer(s) may be trained by processing the training data, evaluating the accuracy of its response against the annotation data, and updating the recurrent layer(s) via, for example, gradient descent. The recurrent layer(s) may be deemed trained when it is able to generate embeddings 144 usable by a detector 145 and/or other downstream components to predict occurrence of acoustic events of interest in non-training data; for example, within a desired accuracy.

The RNN 142 may include or interface with a self-attention mechanism. The self-attention mechanism may aid the RNN 142 in emphasizing features of the audio data 131 that may be more useful for identifying acoustic events from the embeddings 144 (e.g., by the detector 145). For example, if an audio clip includes a sound of breaking glass at the beginning followed by indistinct silence or noise, a self-attention mechanism may increase the representation of features from earlier frames of the block of audio data in the final embeddings for the block. In some implementations, a self-attention mechanism may operate by storing hidden states of each recurrent layer node of the RNN 142, which may require a significant memory allocation. To reduce the memory used to calculate the embeddings, the system may employ "streaming" self-attention using the iterative self-attention mechanism 143. The iterative self-attention mechanism 143 may generate the embeddings 144 iteratively. For example, the RNN 142 my process input data in portions, and generate a hidden state for each portion. The iterative self-attention mechanism 143 may calculate a preliminary embedding for the first hidden state and, for each new hidden state, calculate an interim embedding based on the new hidden state and the previous interim embedding (e.g., without a need to store all hidden state data for the entire clip). The iterative self-attention mechanism 143 may normalize the interim embeddings calculated for the hidden state of the last portion of the input data to determine the embeddings 144 for the input data. Self-attention mechanisms are described in additional detail below with reference to FIGS. 2 and 3.

The embeddings 144 may be processed by a detector component 145. The detector component 145 may be any type of logic and/or software configured to detect events represented in the embeddings. Various types of detector components 145 are described below with reference to FIGS. 5A and 5B, for example, comparators, classifiers, and/or additional neural networks. The detector component 145 analyze final embedding data with respect to stored data to determine results data. The stored data may represent audio (e.g., signatures of sounds identifiable in embedding data) of one or more events. The detector component 145 may determine, based at least in part on the results data, that an instance of one or more events has occurred. The detector component 145 may output event data 147 which may represent the one or more events detected in the embeddings 144 (and, by extension, the audio data 131). The detector 145 may send the event data 147 to an event notification component 148. The event notification component 148 may generate and/or cause the system 100 to output a notification to a user in response to the detected event represented in the event data 147; for example, to alert the user that the device 110 has detected an alarm.

The system 100 may include one or more notification system(s) 121 which may include an event notification component 148. Although illustrated as a separate system, notification system(s) 121 may be configured within system(s) 120, device 110, or otherwise depending on system configuration. For example, event notification component 148 may be configured within remote system(s) 120, device 110, or otherwise. The event notification component 148 may handle sending notifications/commands to other devices upon the occurrence of a detected acoustic event. The event notification component 148 may have access to information/instructions (for example as associated with profile storage 170 or otherwise) that indicate what device(s) are to be notified upon detection of an acoustic event, the preferences associated with those notifications or other information. The event notification component 148 may have access to information/instructions (for example as associated with profile storage 170 or otherwise) that indicate what device(s) are to perform what actions in response to detection of an acoustic event (for example locking a door, turning on/off lights, notifying emergency services, or the like. Further detail regarding the event notification component may be found below with regard to FIG. 6.

The system 100 may be a speech-processing system with the device 110 acting as a voice-controlled device. In addition to the components previously described in the context of acoustic event detection, the system 100 may include components for performing speech processing and synthesis, as well as for responding to natural language commands. The system 100 may include a wakeword detector 135, an orchestrator component 130, a profile storage 170, language processing components 192 including an ASR component 150 and an NLU component 160, language output components 193 including an NLG component 179 and a TTS component 180, and/or one or more skill components 190a, 190b, 190c, etc. (collectively "skill components 190"), which may be in communication with one or more skill support systems 125. The system 100 may provide output to a user in the form of synthesized speech, notification sounds, or other output audio 14.

In some implementations, the system 100 may include multiple AFEs 124. For example, the AFE 124 providing audio data 131 to the AED component 140 may differ from the AFE 124 providing audio data to the wakeword detector 135. This may be due to the AED component 140 having a different context window from the wakeword detector 135 (e.g., representing 10 seconds of audio data versus 1 second).

The system 100 may process the audio data 131 to determine whether speech is represented therein. The system 100 may use various techniques to determine whether the input audio data 131 includes speech. In some examples, a voice-activity detector may apply voice-activity detection (VAD) techniques. Such VAD techniques may determine whether speech is present in audio data 131 based on various quantitative aspects of the input audio data 131, such as the spectral slope between one or more frames of the audio data; the energy levels of the audio data in one or more spectral bands; the signal-to-noise ratios of the audio data in one or more spectral bands; or other quantitative or qualitative aspects. In other examples, the system 100 may include a classifier configured to distinguish speech from background noise. The classifier may be implemented by techniques such as linear classifiers, support vector machines, and decision trees. In still other examples, the system 100 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector(s) 135 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector 135 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

In various embodiments, the wakeword detector(s) 135 may use one of a plurality of wakeword-detection models. Each model may be trained to detect a different wakeword. In some embodiments, a single model may detect multiple wakewords. Each wakeword may be associated with a different speech-processing system and/or different speech-processing system configurations (e.g., representing different virtual assistants available to the user via the system 100). Upon detection of a particular wakeword, the system 100 may process the audio data 131 by the corresponding speech-processing system configuration.

In various embodiments, the wakeword-detection model of the wakeword detector(s) 135 is implemented to detect wakewords spoken in different accents corresponding to different countries, regions, or other areas. For example, the wakeword-detection model may be implemented to detect the wakeword "Alexa" whether it is spoken in an Indian, Scottish, or Australian accent. The wakeword-detection model may be also implemented to detect other wakewords in other languages; these other languages may have similar variations in accents that the wakeword-detection model may be similarly implemented to detect.

The wakeword detector(s) 135 may determine a similarity score for the candidate wakeword based on how similar it is to the stored wakeword; if the similarly score is higher than the wakeword-detection threshold, the wakeword detector 135 may determine that the wakeword is present in the audio data, and if the similarity score is less than the wakeword-detection threshold, the wakeword detector 135 may determine that the wakeword not is present in the audio data. For example, if the candidate wakeword matches the stored wakeword very closely, the wakeword detector 135 may determine a similarity score of 100; if the candidate wakeword does not match the stored wakeword at all, the wakeword detector 135 may determine a similarity score of 0. If the wakeword detector 135 determines candidate wakeword partially matches the stored wakeword, it may determine an intermediate similarity score, such as 75 or 85. Though the disclosure herein describes a similarity score of 0-100, wherein zero is least similar and 100 is most similar. The present disclosure is not limited to any particular range of values of the similarity score, and any system or method of determining similarity between a candidate wakeword represented in captured audio data and a stored representation of the wakeword is within the scope of the present disclosure.

Once a wakeword is detected by the wakeword detector(s) 135, the system 100 may begin processing speech represented in the audio data 131. The system 100 may send the audio data 131 to an orchestrator component 130. The orchestrator component 130 may include memory and logic that enables it to transmit various pieces and forms of data to various components of the system, as well as perform other operations as described herein. The orchestrator component 130 may be or include a speech-processing system manager, which may be used to determine which, if any, of the language processing components 192, language output components 193, and/or skill components 190 should receive and/or process the audio data 131 and/or data derived therefrom (e.g., by ASR, NLU, and/or entity resolution).

In some embodiments, the orchestrator component 130 and/or speech-processing system manager communicate with the language processing components 192 using an application programming interface (API). The API may be used to send and/or receive data, commands, or other information to and/or from the language processing components 192. For example, the orchestrator component 130 may send, via the API, the input audio data 131 to language processing components 192 elected by the speech-processing system manager and may receive, from the selected language processing components 192, a command and/or data responsive to the audio data 131.

The language processing components 192 may include an ASR component 150, which may transcribe the input audio data 131 into text data. The text data output by the ASR component 150 may represent one or more than one (e.g., in the form of an N-best list) ASR hypotheses representing speech represented in the input audio data 131. The ASR component 150 may interpret the speech in the input audio data 131 based on a similarity between the audio data 131 and pre-established language models. For example, the ASR component 150 may compare the input audio data 131 with models for sounds (e.g., acoustic units such as phonemes, senons, phones, etc.) and sequences of sounds to identify words that match the sequence of sounds of the speech represented in the input audio data 131. The ASR component 150 may send the text data generated thereby to an NLU component 160, via, in some embodiments, the orchestrator component 130. The text data sent from the ASR component 150 to the NLU component 160 may include a single top-scoring ASR hypothesis or may include an N-best list including multiple top-scoring ASR hypotheses. An N-best list may additionally include a respective score associated with each ASR hypothesis represented therein. The ASR component 150 is described in additional detail below with reference to FIG. 7.

Figure 8:
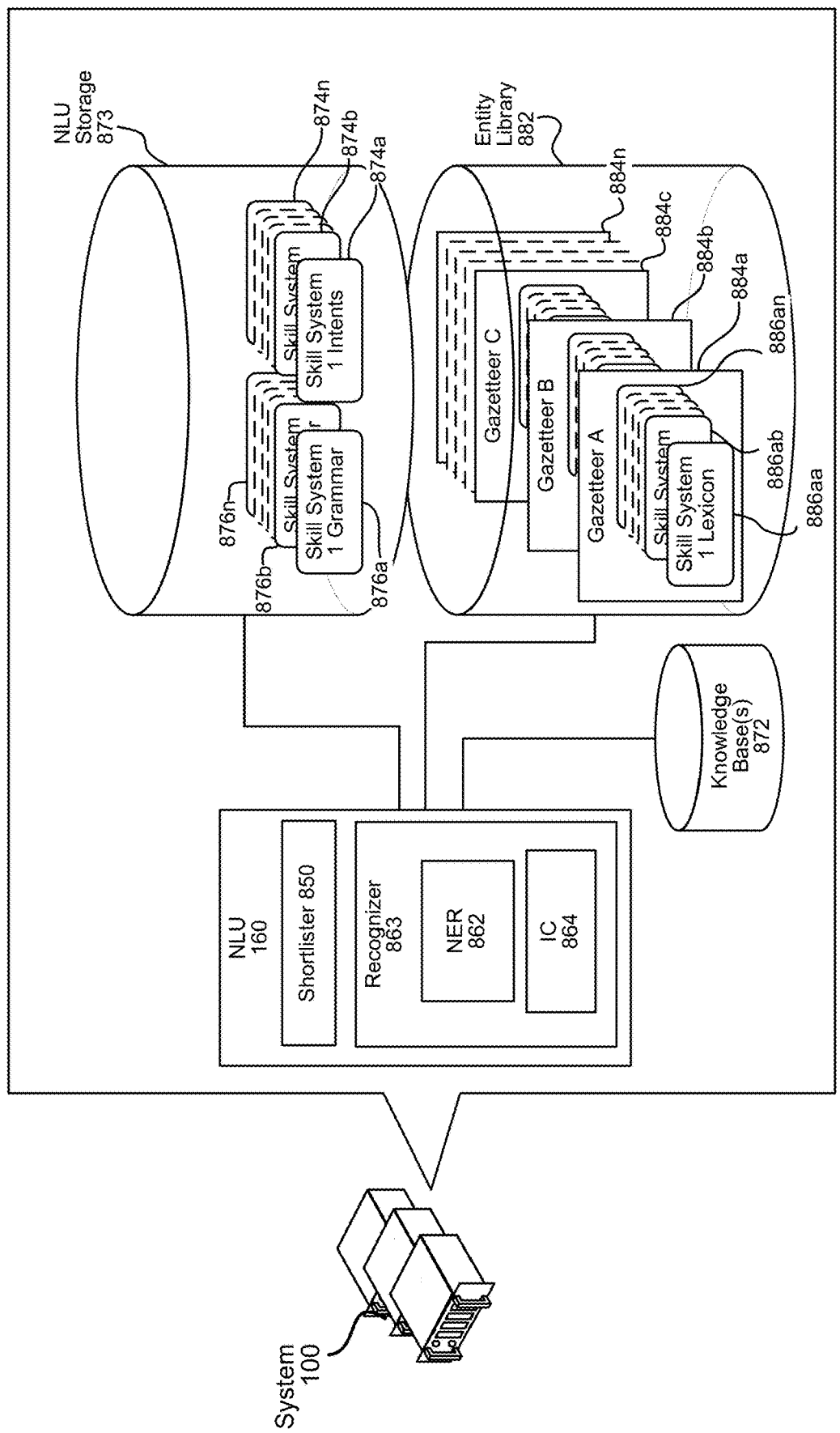
FIGS. 8 and 9 are conceptual diagrams of how natural language processing is performed, according to embodiments of the present disclosure.
Figure 9:
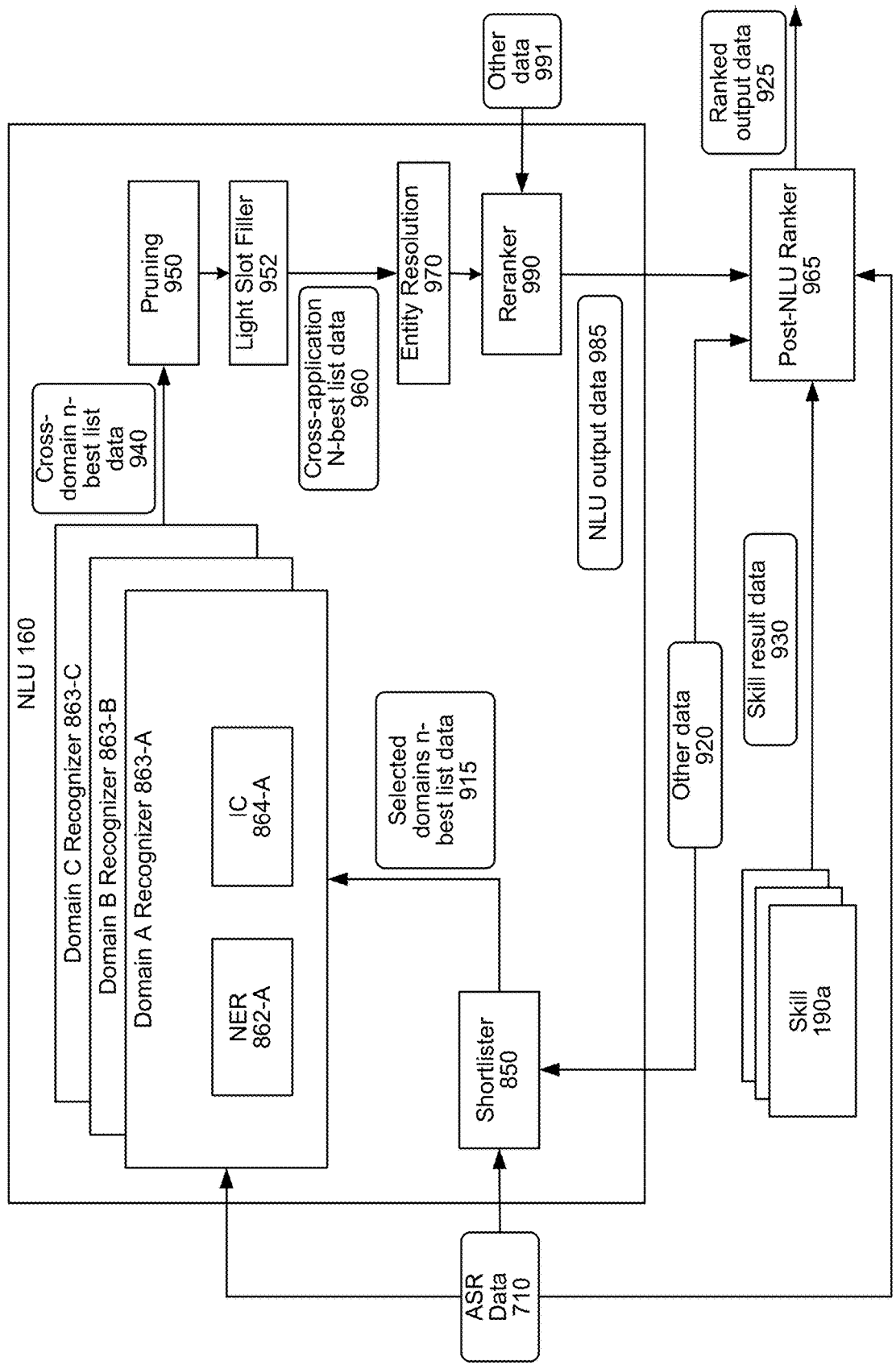

The language processing components 192 may further include a NLU component 160, which is shown in greater detail in FIGS. 8 and 9, that attempts to make a semantic interpretation of the phrase(s) or statement(s) represented in the text data input therein by determining one or more meanings associated with the phrase(s) or statement(s) represented in the text data. The NLU component 160 may determine an intent representing an action that a user desires be performed and may determine information that allows a device (e.g., the user device 110, the system(s) 120, a skill component 190, a skill system(s) 125, etc.) to execute the intent. For example, if the text data corresponds to "play Africa by Toto," the NLU component 160 may determine an intent that the system output music and may identify "Toto" as an artist and "Africa" as the song. For further example, if the text data corresponds to "what is the weather," the NLU component 160 may determine an intent that the system output weather information associated with a geographic location of the user device 110. In another example, if the text data corresponds to "turn off the lights," the NLU component 160 may determine an intent that the system turn off lights associated with the user device 110 or its user.

The NLU results data may be sent (via, for example, the orchestrator component 130) from the NLU component 160 (which may include tagged text data, indicators of intent, etc.) to a skill component(s) 190. If the NLU results data includes a single NLU hypothesis, the NLU component 160 may send the NLU results data to the skill component(s) 190 associated with the NLU hypothesis. If the NLU results data includes an N-best list of NLU hypotheses, the NLU component 160 may send the top scoring NLU hypothesis to a skill component(s) 190 associated with the top scoring NLU hypothesis. In some implementations, the NLU component 160 and/or skill component 190 may determine, using the interaction score, text data representing an indication of a handoff from one set of language processing components 192 to another (e.g., corresponding to a different virtual assistant profile).

A skill component 190 may be software running on or in conjunction with the system 100 that is, or is similar to, a software application. A skill component 190 may enable the system 100 to execute specific functionality in order to provide data or produce some other requested output. One example of a skill component 190 is an AED skill component, as described herein, that causes output of prompts for occurrences of an acoustic event and coordinates reconfiguration of the AED component 140 in accordance with corresponding received audio data. The system 100 may be configured with more than one skill component 190. For example, a weather service skill component may enable the system 100 to provide weather information, a car service skill component may enable the system 100 to book a trip with respect to a taxi or ride sharing service, a restaurant skill component may enable the system 100 to order a pizza with respect to the restaurant's online ordering system, etc. A skill component 190 may operate in conjunction between the system(s) 120 and other devices, such as the user device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

Skill support system(s) 125 may communicate with a skill component(s) 190 within the system(s) 120 directly and/or via the orchestrator component 130. A skill support system(s) 125 may be configured to perform one or more actions. A skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, an AED skill component may re-configure the AED component 140, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. The system 100 may include a skill component 190 dedicated to interacting with the skill support system(s) 125. A skill, skill device, or skill component may include a skill component 190 operated by the system 100 and/or skill operated by the skill support system(s) 125.

Figure 7:
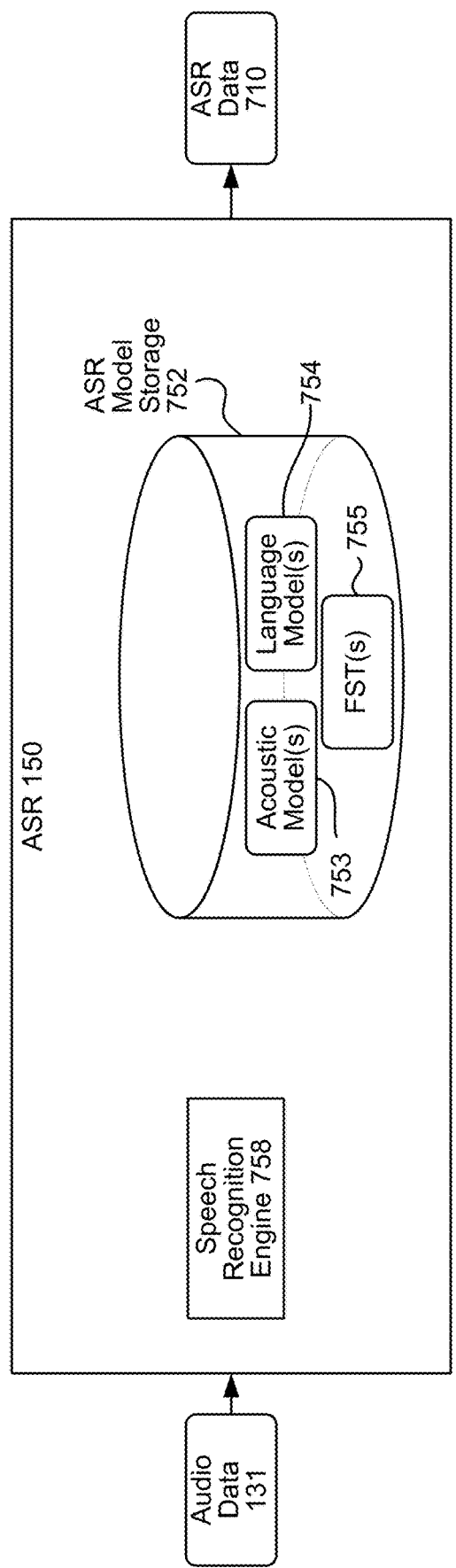
FIG. 7 is a conceptual diagram of an ASR component, according to embodiments of the present disclosure.

The system 100 may include language output components 193 including a natural language generation component 179 and/or a TTS component 180, which is shown in greater detail in FIG. 7. The TTS component 180 may generate audio data (e.g., synthesized speech) from text data using one or more different methods. Text data input to the TTS component 180 may come from a skill component 190, the orchestrator component 130, and/or another component of the system. The text data may include an indication of a speech-processing component and/or data responsive to a command.

The system 100 may include profile storage 170. The profile storage 170 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information. The profile storage 170 may include one or more user profiles, with each user profile being associated with a different user identifier. Each user profile may include various user identifying information. Each user profile may also include preferences of the user and/or one or more device identifiers, representing one or more devices of the user. When a user logs into to, for example, an application installed on the device 110, the user profile (associated with the presented login information) may be updated to include information about the device 110. As described, the profile storage 170 may further include data that shows an interaction history of a user, including commands and times of receipt of commands. The profile storage 170 may further include data that shows when a second user was present to hear an indication of a handoff for a command uttered by a first user.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 170 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system 100 may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1B illustrates the system 100 configured to detect an acoustic event in a smart home environment, according to embodiments of the present disclosure. The system 100 may include the device 110*a*, the system 120, and notification system(s) 121 as previously described. The system 100 may additionally include one or many additional devices 110 with smart home functionality, such as a lamp 110*p* and a power outlet 110*q*. The system 100 may include an additional user device, such as the smart phone 110*b*, to which the system 100 may send notifications and/or from which the system 100 may receive commands; for example, to change a physical state or, or otherwise operate, the lamp 110*p*, the outlet 110*q*, and/or other smart home devices. The system 100 may include (e.g., in the devices 110*a* and/or the system 120) the AFE 124, AED component 140, and event notification component 148. The event notification component 148 may send notifications (e.g., to the smart phone 110*b*) regarding detected events such as glass breaking, a door opening or closing, etc.

The system 100 may receive input audio such as the event audio 22, and generate audio data 131 using the AFE 124. The AED component 140 may process the audio data 131 to generate embeddings 144 and/or event data 147 representing features of the audio data 131 and/or a detected acoustic event. An acoustic event may be an event identified in the presence of an acoustic background. The system 100 may send the event data 147 to an event notification component 148 configured to generate and issue notifications upon detection of certain acoustic events. The system 100 may send the event data 147 to a smart home skill component 190*d*, which may be configured to operate smart home devices based on preset rules and/or learned behaviors.

A smart home skill component 190*d* may send commands to operate smart home devices and/or receive status or diagnostic information from the smart home devices. The smart home skill component 190*d* may receive event data 147 from the AED component 140 and perform configured and/or learned behaviors, such as changing a physical state of a smart home device. For example, the smart home skill component 190*d* may be configured to turn on the lamp 110*p* upon detecting the opening of a door leading to the room containing the lamp 110*p*. The smart home skill component 190*d* may be configured to turn on outdoor lighting based on a disturbance acoustically detected in a yard, and/or activate a security camera or increase a frame rate of the security camera to capture a source of the disturbance. In concert, the event notification component 148 may send a notification to the smart phone 110*b* regarding the detected disturbance. The smart phone 110*b* may issue a push notification, which may be accompanied by output audio 14 such as an alert tone, to alert the user to the disturbance.

Similarly, the smart home skill component 190*d* may control electricity delivery from the outlet 110*q* based on preset rules and/or learned behaviors. For example, the smart home skill component 190*d* may determine to cut power from the outlet 110*q* in response to a sudden surge in current possibly indicating failure of an appliance. Additionally/alternatively, a user may configure the smart home skill component 190*d* to turn on the outlet 110*q* based on detection if an infant crying, so as to activate a music player, white noise generator, light projector, etc., for soothing the baby. The smart home skill component 190*d* may be configured with additional functionality, such as locking/unlocking a pet door in response to a particular dog's bark. The smart home skill component 190*d* may operate additional automated smart home devices such as autonomous or semi-autonomous appliances such as a vacuum cleaner or drone with a camera. For example, the smart home skill component 190*d* may direct such a robot or appliance to a room where an event has been detected (e.g., to vacuum broken glass or obtain video of a disturbance). The smart home skill component 190*d* may additionally be configured to receive NLU output data (e.g., ranked output data 925 from the NLU component 160) from a speech processing system and operate, configure, and/or diagnose one or more smart home devices according to user.

FIG. 2 illustrates using non-streaming self-attention to generate embeddings 144 representing sequential data 231, according to embodiments of the present disclosure. The RNN 142 and self-attention mechanism 243 may process sequential data 231 to generate embeddings 144. The sequential data 231 may be audio data 131, ASR data (e.g., text), video data, or other time series data such as sensor data, etc. The embeddings 144 may then be provide to one or more downstream components such as the detector 145, a neural network decoder, etc.

The RNN 142 may receive the sequential data 231 and process it in portions, such as the segments 0 through n shown in FIG. 2. The segments 0 through n may be consecutive, overlapping, or non-continuous. The sequential data 231 and/or the segments may have a fixed size or be of varying length. Cells of the recurrent layer(s) of the RNN 142 may generate hidden state data 220 ($h_t$) using each segment of the input data and the hidden state data 220 generated for the previous segment ($h_{t-1}$). Thus, the RNN 142 may generate a hidden state $h_0$ for segment 0, $h_1$ for segment 1, etc., and each hidden state $h_t$ may be used in determining the hidden state $h_{t+1}$ for the next segment. The self-attention mechanism 243 may receive the hidden state data 220 (e.g., $h_0$ through $h_n$ corresponding to segment 0 through segment n) and generate the embeddings 144 ($M_i$) according to Equations 1-3 as shown below.

$$D_t = \tanh(W_1 h_t) \quad (1)$$

In Equation 1, $D_t$ represents a non-linear transformation of the hidden state data 220. $D_t$ may be determined by taking the hyperbolic tangent function of the hidden state multiplied by a weight matrix $W_1$. The result $$a_{i_t} = \frac{e^{W_2 D_t}}{\sum_{k=1}^{T} e^{W_2 D_k}} \quad (2)$$

In Equation 2, $a_{i_t}$ represents a softmax weighted (e.g., by weight matrix $W_2$) summation of the $D_t$ events at time t.

$$M_i = \sum_{t=1}^{n} a_{i_t} \cdot h_t \quad (3)$$

Equation 3 shows how the embeddings 144 $M_i$ may be determined based on summing the hidden states as weighted based on the attention $a_{i_t}$. The embeddings 144 may be output to, for example, the detector 145.

To apply self-attention in this manner, however, the system 100 may store all hidden state data $h_t$ for all time points t=1 through t=n, representing successive portions of the input data 231. To conserve memory space, the system 100 can implement an iterative self-attention mechanism by modifying the Equations 1 through 3 as shown below.

Figure 3:
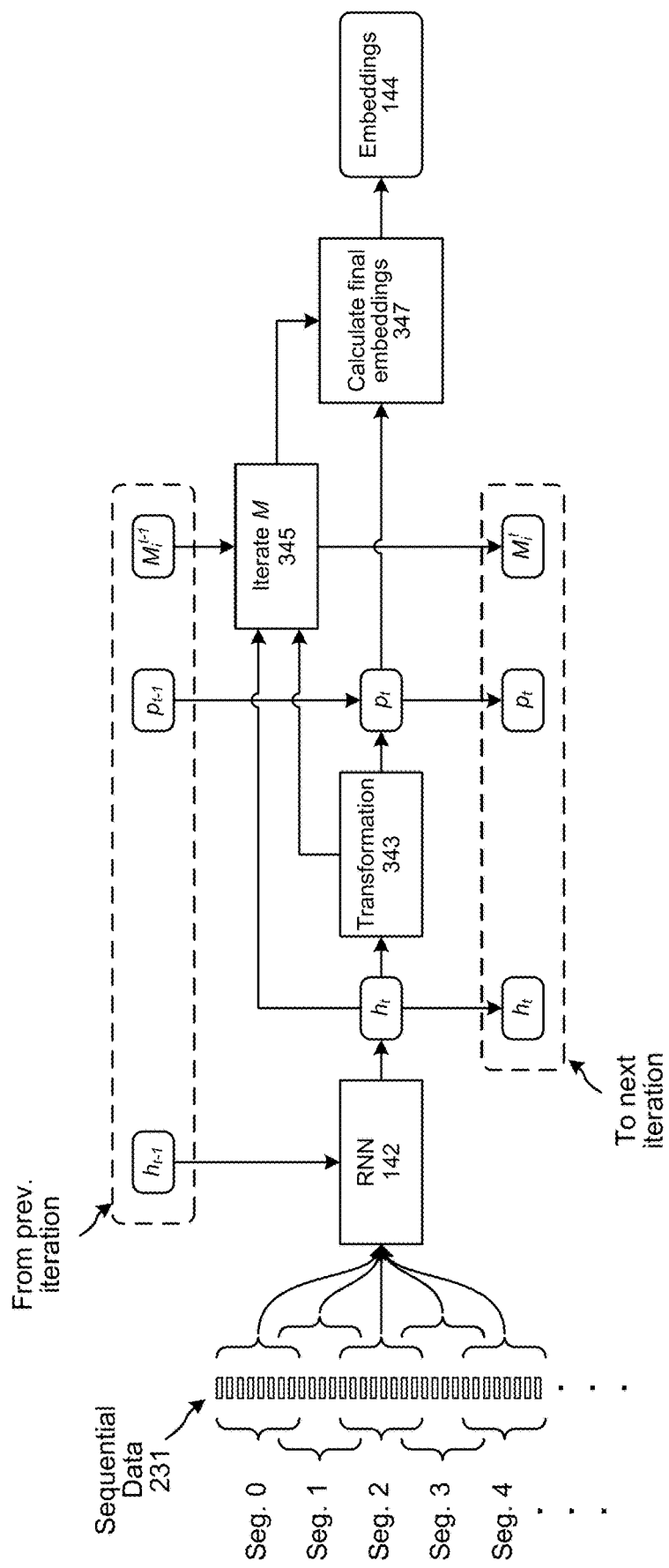
FIG. 3 illustrates using streaming self-attention to generate embeddings representing sequential data, according to embodiments of the present disclosure.

FIG. 3 illustrates using streaming self-attention to generate embeddings 144 representing sequential data 231, according to embodiments of the present disclosure. In the streaming self-attention illustrated in FIG. 3, the system 100 need not store all the hidden state data for all segments of the input data 231. Rather, the system 100 may iteratively generate interim (e.g., temporary) embeddings for each segment based on hidden state data for the current segment as well as the previous interim embedding and an interim variable value (which may be used to normalize the embeddings once all segments have been processed). The system 100 may iteratively update a value of an interim variable pt that the system 100 may use to normalize the last interim embeddings to generate the final embeddings 144 according to Equations 4-7 as shown below.

A transformation 343 calculates $D_t$ and $a_{i_t}$. Rather than calculate at for all segments as in Equation 2, which uses hidden state data for all segments, Equation 4 calculates $a_{i_t}$ for the current segment:

$$a_{i_t} = e^{W_2 D_t} \quad (4)$$

The system 100 may also calculate an value for the interim variable $P^t$ based on a current value of $D_t$ (and a previous value of the interim variable $P^{t-1}$, if available) according to Equation 5:

$$P^t = P^{t-1} + e^{W_2 D_k} \quad (5)$$

An calculation 345 iterates M. A calculation 345 may, for each segment, calculate an interim embedding $M_i^t$ using a dot product of $a_{i_t}$ and the current hidden state data $h_t$ (and a previous value of the interim embedding $M_i^{t-1}$, if available) according to Equation 6:

$$M_i^t = M_i^{t-1} + a_{i_t} \cdot h_t \quad (6)$$

A calculation 347 determines the final embeddings 144. The final embeddings 144 may be determined using the value of interim variable $P^n$ generated for the last segment to normalize the interim embedding $M_i^n$ generated for the last segment per Equation 7:

$$M_i = \frac{M_i^n}{P^n} \quad (7)$$

Thus, for each segment of the input data 231, the system 100 may calculate a hidden state based on a previous hidden state, calculate an interim variable value based on the previous interim variable value and a transformation of the current hidden state, and calculate an interim embedding based on the previous interim embedding and the current hidden state. Once all segments of the input data 231 have been processed by the RNN 142, the embeddings 144 may be determined by using the interim variable value calculated for the last segment to normalize the interim embedding calculated for the last segment. In other words, previous hidden state data is not needed to calculate the embeddings 144, and self-attention has been applied iteratively by calculating $a_{i_t}$ and $P^t$ for each segment of the input data 231.

Figure 4:
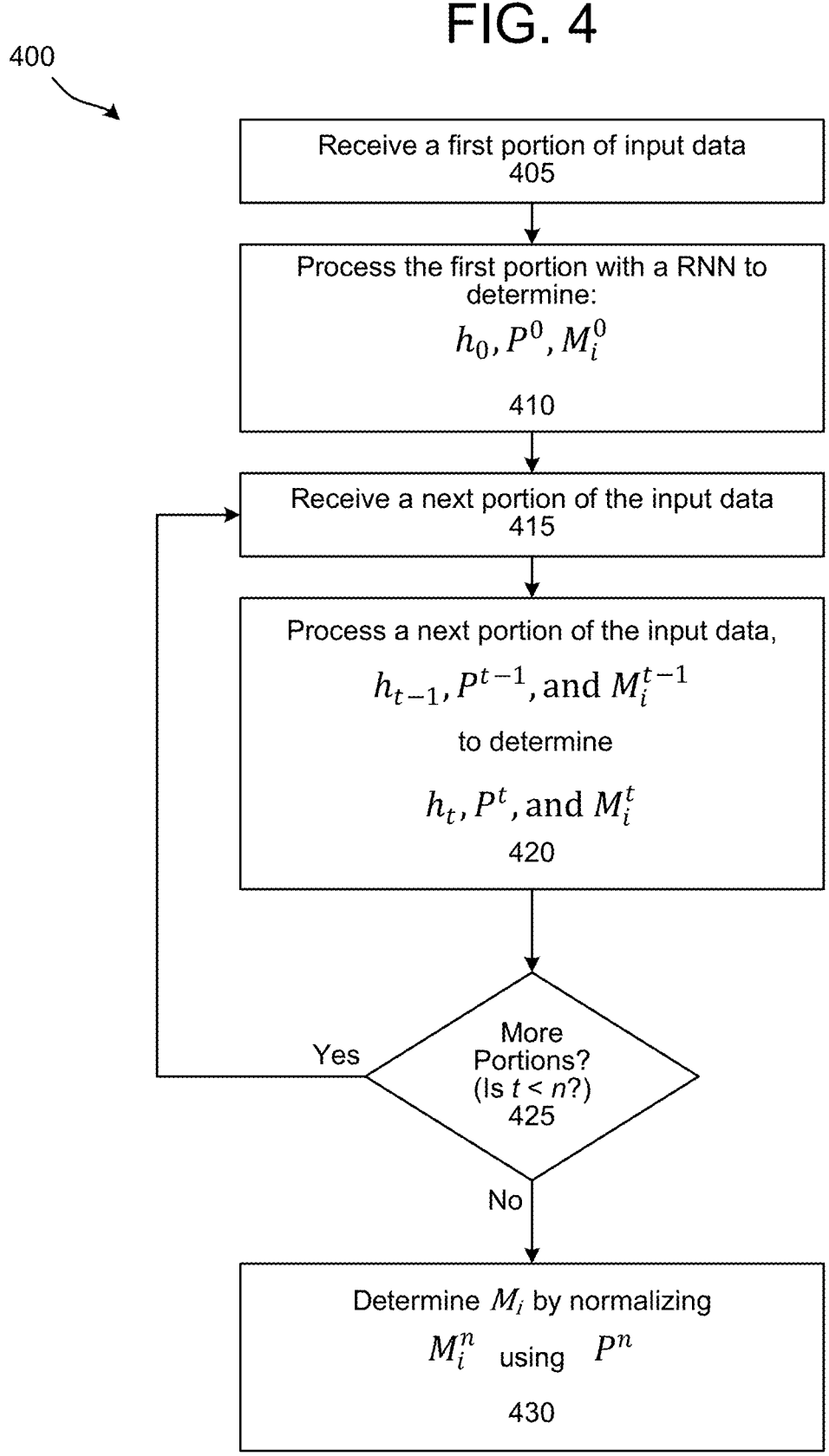
FIG. 4 is flowchart illustrating an example method of using streaming self-attention to generate embeddings representing sequential data, according to embodiments of the present disclosure.

FIG. 4 is flowchart illustrating an example method 400 of using streaming self-attention to generate embeddings representing sequential data, according to embodiments of the present disclosure. The method 400 may include receiving (405) a first portion of input data. The method 400 may include (410) processing the first portion of the input data using a RNN to determine first hidden state data $h_0$, a preliminary variable value $P^0$, and a preliminary embedding $M_i^0$. The method 400 may include receiving (415) a next portion of the input data. The method 400 may include processing (420) the next portion, the previous hidden state data $h_{t-1}$, the previous (e.g., preliminary or interim) variable value $P^{t-1}$, and the previous (e.g., preliminary or interim) embedding $M_i^{t-1}$ to determine next hidden state data $h_t$, a next interim variable value $P^t$, and a next interim embedding $M_i^t$. The method 400 may include determining (425) whether there are more portions of input data to process (e.g., is t<n, where t represents the latest portion of the input data processed and n represents the number of portions of the input data). If there are more portions of input data to process ("yes" at 425), the method 400 may return to the stage 415 and receive the next portion of the input data. If there are no further portions of input data to process ("no" at 425), the method 400 may proceed to a stage 430. The method 400 may determine (430) embeddings M representing features extracted from the input data by the RNN by normalizing the last interim embedding $M_t''$ using the last interim variable value $P''$.

Figure 5A:
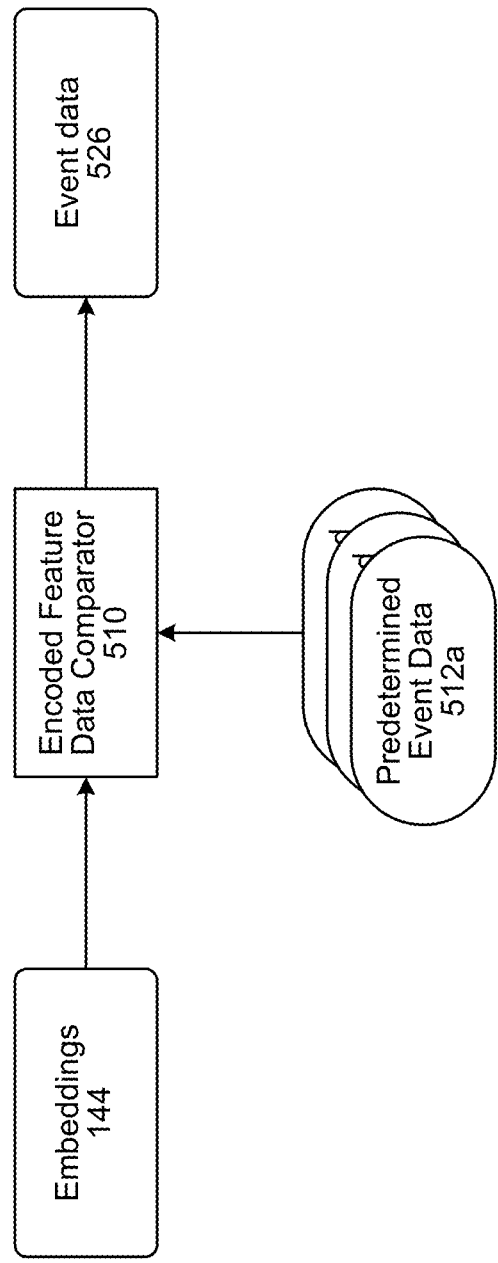
FIGS. 5A and 5B illustrate example detector components, according to embodiments of the present disclosure.
Figure 5B:
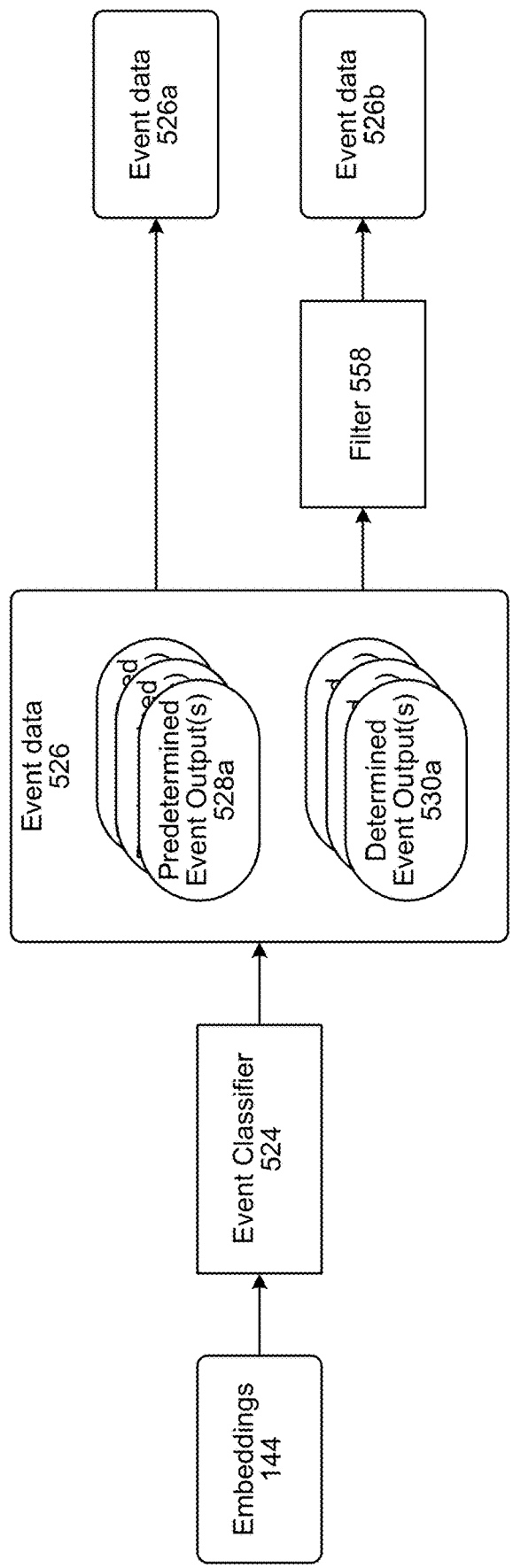

FIGS. 5A and 5B illustrate example detector components 145, according to embodiments of the present disclosure. The AED 140 may include an encoded feature data comparator 510, which may perform operations as described with reference to FIG. 5A. The AED 140 may additionally or alternatively include an event classifier 524 which may classify incoming audio data/feature data with respect to whether such data represents an acoustic event that the classifier 524 is trained to recognized as described with reference to FIG. 5B below or otherwise discussed herein. The AED 140 may include additional neural networks such as one or more CRNNs and/or LSTMs for detecting prebuild and/or custom sounds. The AED 140 may output an indication of detection of an event as event data 526. Such event data 526 may include an identifier of the detected event, a score corresponding to the likelihood of detection, or other related data. Such event data 526 may then be sent over network 199 and/or to a downstream component, for example notification system(s) 121/event notification component 148 (e.g., as described below with reference to FIG. 6) or another device.

FIG. 5A illustrates operations of a first example detector component 145, according to embodiments of the present disclosure. An encoded feature data comparator 510 may receive and process the embeddings 144 generated by the RNN 142 and/or self-attention mechanism 143. The encoded feature data comparator 510 may analyze the embeddings 144 with respect to one or more items of predetermined event data 512a, 512b, and/or 512c, etc. (collectively "predetermined event data 512"), each of which may correspond to a predetermined event, such as a generic doorbell ring. For example, the encoded feature data comparator 510 may calculate a cosine similarity between the embeddings and the predetermined event data 512. If each of the values of the embeddings 144 (e.g., each of the values of the N-vector) are within a threshold or thresholds of each of the corresponding values of one of the predetermined event data 512, the encoded feature data comparator 510 may determine that a corresponding event occurred and may send event data 526 indicating the detected event to other components of the system 100 for further processing (e.g., output corresponding to detection of the event).

FIG. 5B illustrates operations of a second example detector component 145, according to embodiments of the present disclosure. The detector component 145 of FIG. 5B may include an event classifier 524. The event classifier 524 may be a classifier trained to distinguish between different acoustic events and other sounds. Examples of trained classifiers include support-vector machines (SVMs), neural networks, decision trees, AdaBoost (short for "Adaptive Boosting") combined with decision trees, and random forests. For example, a SVM is a supervised learning model with associated learning algorithms that analyze data and recognize patterns in the data and may be used for classification and regression analysis. Given a set of training examples, each marked as belonging to one of two categories (e.g., acoustic event vs. non-acoustic event), an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. The event classifier 524 may issue a "score" indicating which category the data most closely matches. The score may provide an indication of how closely the data matches the category. The event classifier 524 may output event data 526 including one or more event detection outputs, each of which may indicate a yes/no decision as to whether an associated acoustic event has occurred.

The detector component 145 may analyze the embeddings 144 using the event classifier 524 to identify one or more predetermined event outputs 528 and/or determined event outputs 530. The event classifier 524 may process the embeddings 144 determined by the RNN 142 and/or self-attention mechanism 143 from audio data 131. The event classifier 524 may output one or more event output(s) 526 corresponding to one or more predetermined event outputs(s) 528a, 528b, 528c, etc. and/or one or more determined event output(s) 530a, 530b, 530c, etc. The event classifier 524 may similarly be reconfigured, by the user device 110 and/or remote system(s) 120, to detect one or more determined event output(s) 530 based at least in part on audio data corresponding to occurrences of new acoustic events.

The audio data corresponding to the occurrences of new acoustic events may be used as training data to re-train the event classifier 524 to detect the new event(s). For example, the event classifier 524 may process the embeddings 144, and its output may be evaluated using a performance function, such as a loss function, to evaluate its performance in detecting the new event as a new determined event output 530. New values of nodes of the event classifier 524 may be determined using a stochastic process, such as a gradient descent algorithm, and then back-propagated throughout. If the event classifier 524 fails to determine the new event, the system 100 may output further prompts for further audio data representing further occurrences of the event, which then may be used as further training data for the event classifier 524. If the system 120 performs this training, it may send, to the user device 110, configuration data for the AED component 140, which may be instructions that implement an AED component 140 and/or configuration data for re-configuring an existing AED component 140 (e.g., new values for some or all of the nodes of the RNN 142).

As shown in FIG. 5B, the event classifier 524 may determine event raw prediction data 526a. In some implementations, the detector component 145 may include a filter 558 to pass only filtered event data 526b for one or more top-scoring adjusted time windows (e.g., the top 50 or top 100) to other components. The filter 558 may also employ non-maximum suppression (NMS) or other techniques to avoid passing to the other components candidate time windows that may substantially overlap. For example, the filter 558 may evaluate incoming candidate adjusted time windows in the event prediction data 526 against each other to make sure that individual candidate time windows are sufficiently independent from each other. The filtered event output data 526b may not necessarily, however, include scores for the time windows.

Figure 6:
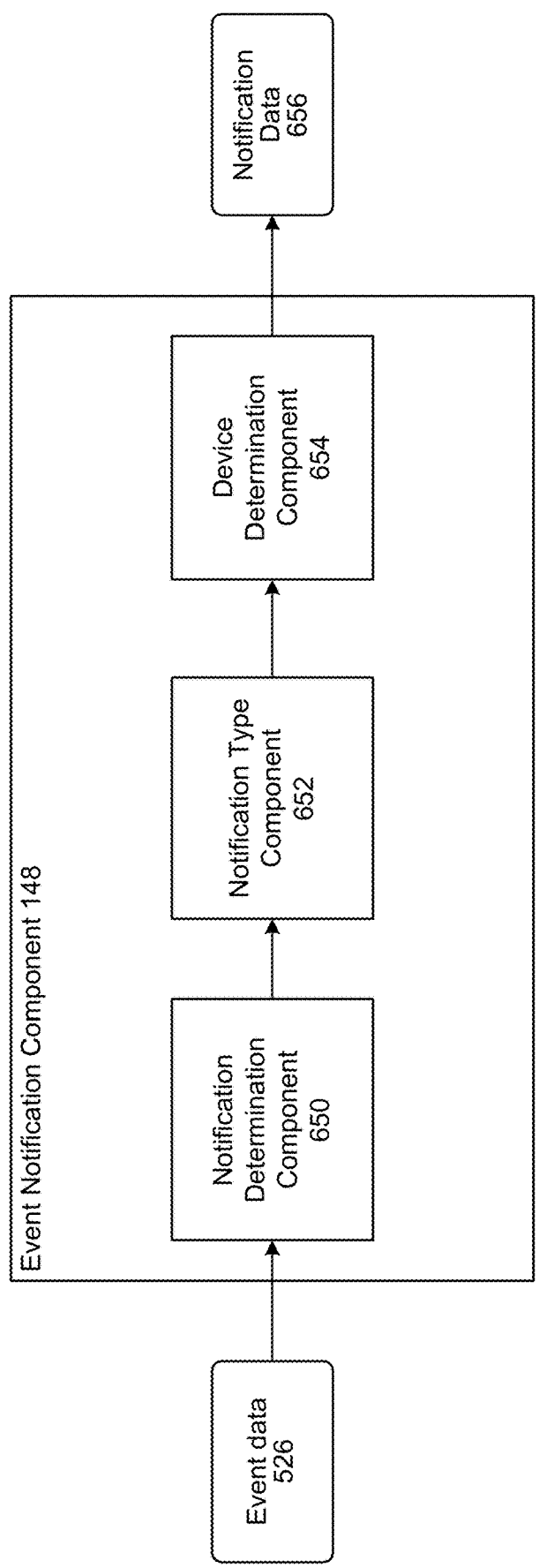
FIG. 6 illustrates an event notification component according to embodiments of the present disclosure.

FIG. 6 illustrates an event notification component 148 according to embodiments of the present disclosure. As shown in FIG. 6, the event notification component 148 may include a notification-determination component 650, a notification-type component 652, and/or a device-determination component 654. The notification-determination component 650 may receive one or more of the event output(s) 526 and determine if a notification corresponding to the event(s) should be sent to one or more device(s). The event output(s) 526 may, for example, indicate a first kind of event, such as glass breaking or a baby crying, and the notification-determination component 650 may determine that a corresponding notification should be sent to a user device. The event output(s) 526 may, on the other hand, indicate a second kind of event, such as a dog bark, and the notification-determination component 650 may determine that no notification may be sent. The notification-determination component 650 may make this determination by determining data identifying the event and determining a corresponding user preference (as stored in, for example, the profile storage 170) for receiving notifications corresponding to the event. That is, a user of the user device may have input a preference for receiving a notification corresponding to a particular event, and the notification-determination component 650 may determine to send a notification based on the preference. In some embodiments, the notification-determination component 650 determines whether or not to send a notification based at least in part on the type of the event. For example, if the event corresponds to a potentially dangerous or rare event, such as glass breaking, the notification-determination component 650 may determine to send the notification.

The notification-type component 652 may determine the type of the notification to be sent. Types of notifications may include text messages, emails, phone calls, push notifications, or other such notifications. Like the notification-determination component 650, the notification-type component 652 may determine the type of the notification based on a user preference stored in the profile storage 170. The notification-type component 652 may similarly determine the type of the notification based on the type of the event, wherein potentially dangerous or rare events may correspond to a first type of notification, such as a phone call, while other types of events may correspond to a second type of notification, such as an email.

A device-determination component 654 may determine which of a potential plurality of user devices should receive the notification(s). In some embodiments, the device-determination component 654 may determine that the notification(s) (e.g., notification data 656) are to be sent to every device associated with a user account stored in the profile storage 170. In other embodiments, the device-determination component 654 determines that the notification(s) are to be send to a subset of the devices. For example, for one event (e.g., a high priority event) a user may indicate that every device associated with the user profile be notified if the event is detected. In another example, for a different event (e.g., a low priority event) a user may indicate that only a single specific device associated with the user profile be notified if the event is detected. In another example, a user may indicate that another device outside the user profile be notified if an event is detected (e.g., if a toilet running is detected send a notification to a device/telephone number associated with a plumber).

The described system 100 may be used to create various acoustic event detection data for different events as detectable by different devices in different locations. For example, for a same acoustic event, the system 100 may prompt the user to walk through audio capture by several different devices (for example one device in the living room, one device in the kitchen, etc.). The system 100 may instruct the user to cause the event and may capture acoustic data from multiple different devices while the event occurs. The system 100 may use this combined information to form one set of AED configuration data that may be used by multiple devices (e.g., jointly trained AED data goes to each device). Alternatively (or in addition) the system 100 may use the audio data from each device to train different AED configuration data for the different devices. For example, the audio data captured by the kitchen device may be used to train AED configuration data to be used by the kitchen device and audio data captured by a living room device may be used to train AED configuration data to be used by the living room device, thus resulting in two different trained AED models even though they are trained to detect the same acoustic event, albeit from different locations (and potentially different devices).

The described system 100 may also be used to create various acoustic event detection data for the same as detectable by a same device, though if the event occurs in a different location relative to the detecting device. For example, to a device in a kitchen an electronic toy left on may sound different when the toy is in the living room as opposed the toy being in the dining room (depending, of course, on home acoustics, properties of the sound, properties of the detecting device, etc.). In such a situation the system 100 may create one set of AED configuration data (e.g., trained AED model) for the acoustic event from a first location and another set of AED configuration data (e.g., trained AED model) for the acoustic event from a second location different from the first location. To do so the system 100 may need to go through the training/prompting steps for each location and then may capture respective audio data corresponding to the respective location in order to train the separate AED model(s). The AED model(s) may then be loaded onto a device 110 which, when it attempts to detect a future event, may operate both AED model(s). Thus if a particular model is used to detect the event, the device 110 may also be able to output an indication of a location of a source of the event based on which AED model was used to recognize the event. For example, if an AED model corresponding to an acoustic event originating in location A (e.g., the living) results in a higher confidence than an AED model corresponding to the same acoustic event originating in location B (e.g., the dining room), the device 110 may output an indication that the event was detected in location A.

In certain configurations, if the user replaces a device 110a at a particular location, the user may indicate to the system 100 that the new device 110b will be located at the same location. The system 100 may then send the appropriate AED configuration data (e.g., AED model(s)) to the new device 110b so the new device 110b can be configured to recognize the same acoustic events as the older device 110a.

FIG. 7 is a conceptual diagram of an ASR component 150, according to embodiments of the present disclosure. The ASR component 150 may interpret a spoken natural language input based on the similarity between the spoken natural language input and pre-established language models 754 stored in an ASR model storage 752. For example, the ASR component 150 may compare the audio data with models for sounds (e.g., subword units or phonemes) and sequences of sounds to identify words that match the sequence of sounds spoken in the natural language input. Alternatively, the ASR component 150 may use a finite state transducer (FST) 755 to implement the language model functions.

When the ASR component 150 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 753 stored in the ASR model storage 752), and the likelihood that a particular word, which matches the sounds, would be included in the sentence at the specific location (e.g., using a language or grammar model 754). Based on the considered factors and the assigned confidence score, the ASR component 150 may output an ASR hypothesis that most likely matches the spoken natural language input, or may output multiple ASR hypotheses in the form of a lattice or an N-best list, with each ASR hypothesis corresponding to a respective score.

The ASR component 150 may include a speech recognition engine 758. The ASR component 150 receives audio data 131 (for example, received from a local device 110 having processed audio detected by a microphone by an acoustic front end (AFE) or other component). The speech recognition engine 758 compares the audio data 131 with acoustic models 753, language models 754, FST(s) 755, and/or other data models and information for recognizing the speech conveyed in the audio data. The audio data 131 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 758 may process the audio data 131 with reference to information stored in the ASR model storage 752. Feature vectors of the audio data 131 may arrive at the system 120 encoded, in which case they may be decoded prior to processing by the speech recognition engine 758.

The speech recognition engine 758 attempts to match received feature vectors to language acoustic units (e.g., phonemes) and words as known in the stored acoustic models 753, language models 754, and FST(s) 755. For example, audio data 131 may be processed by one or more acoustic model(s) 753 to determine acoustic unit data. The acoustic unit data may include indicators of acoustic units detected in the audio data 131 by the ASR component 150. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 754 (and/or using FST 755) to determine ASR data 710. The ASR data 710 can include one or more hypotheses. One or more of the hypotheses represented in the ASR data 710 may then be sent to further components (such as the NLU component 160) for further processing as discussed herein. The ASR data 710 may include representations of text of an utterance, such as words, subword units, or the like.

The speech recognition engine 758 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 150 will output ASR hypotheses that make sense grammatically. The specific models used may be general models or may be models corresponding to a particular domain, such as music, banking, etc.

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 758 may use the acoustic model(s) 753 to attempt to match received audio feature vectors to words or subword acoustic units. An acoustic unit may be a senone, phoneme, phoneme in context, syllable, part of a syllable, syllable in context, or any other such portion of a word. The speech recognition engine 758 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 150 outputs ASR hypotheses that make sense grammatically.

The speech recognition engine 758 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMI and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 758, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 758 may also compute scores of branches of the paths based on language models or grammars. Language modeling involves determining scores for what words are likely to be used together to form coherent words and sentences. Application of a language model may improve the likelihood that the ASR component 150 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

FIGS. 8 and 9 illustrates how the NLU component 160 may perform NLU processing. FIG. 8 is a conceptual diagram of how natural language processing is performed, according to embodiments of the present disclosure. And FIG. 9 is a conceptual diagram of how natural language processing is performed, according to embodiments of the present disclosure.

FIG. 8 illustrates how NLU processing is performed on text data. The NLU component 160 may process text data including several ASR hypotheses of a single user input. For example, if the ASR component 150 outputs text data including an n-best list of ASR hypotheses, the NLU component 160 may process the text data with respect to all (or a portion of) the ASR hypotheses represented therein.

The NLU component 160 may annotate text data by parsing and/or tagging the text data. For example, for the text data "tell me the weather for Seattle," the NLU component 160 may tag "tell me the weather for Seattle" as an <OutputWeather> intent as well as separately tag "Seattle" as a location for the weather information.

The NLU component 160 may include a shortlister component 850. The shortlister component 850 selects skills that may execute with respect to ASR output data 710 input to the NLU component 160 (e.g., applications that may execute with respect to the user input). The ASR output data 710 (which may also be referred to as ASR data 710) may include representations of text of an utterance, such as words, subword units, or the like. The shortlister component 850 thus limits downstream, more resource intensive NLU processes to being performed with respect to skills that may execute with respect to the user input.

Without a shortlister component 850, the NLU component 160 may process ASR output data 710 input thereto with respect to every skill of the system, either in parallel, in series, or using some combination thereof. By implementing a shortlister component 850, the NLU component 160 may process ASR output data 710 with respect to only the skills that may execute with respect to the user input. This reduces total compute power and latency attributed to NLU processing.

The shortlister component 850 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 850 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 850 may be trained with respect to a different skill. Alternatively, the shortlister component 850 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 850. For example, some sample user inputs may be positive examples (e.g., user inputs that may be used to invoke the skill). Other sample user inputs may be negative examples (e.g., user inputs that may not be used to invoke the skill).

As described above, the shortlister component 850 may include a different trained model for each skill of the system, a different trained model for each domain, or some other combination of trained model(s). For example, the shortlister component 850 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 850 to output indications of only a portion of the skills that the ASR output data 710 may relate to. For example, a user input may correspond to "tell me about Tom Collins." If the model is clustered based on domain, the shortlister component 850 may determine the user input corresponds to a recipe skill (e.g., a drink recipe) even though the user input may also correspond to an information skill (e.g., including information about a person named Tom Collins).

The NLU component 160 may include one or more recognizers 863. In at least some embodiments, a recognizer 863 may be associated with a skill system 125 (e.g., the recognizer may be configured to interpret text data to correspond to the skill system 125). In at least some other examples, a recognizer 863 may be associated with a domain such as smart home, video, music, weather, custom, etc. (e.g., the recognizer may be configured to interpret text data to correspond to the domain).

If the shortlister component 850 determines ASR output data 710 is potentially associated with multiple domains, the recognizers 863 associated with the domains may process the ASR output data 710, while recognizers 863 not indicated in the shortlister component 850's output may not process the ASR output data 710. The "shortlisted" recognizers 863 may process the ASR output data 710 in parallel, in series, partially in parallel, etc. For example, if ASR output data 710 potentially relates to both a communications domain and a music domain, a recognizer associated with the communications domain may process the ASR output data 710 in parallel, or partially in parallel, with a recognizer associated with the music domain processing the ASR output data 710.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity associated with a domain, associated with the recognizer 863 implementing the NER component 862. The NER component 862 (or other component of the NLU component 160) may also determine whether a word refers to an entity whose identity is not explicitly mentioned in the text data, for example "him," "her," "it" or other anaphora, exophora, or the like.

Each recognizer 863, and more specifically each NER component 862, may be associated with a particular grammar database 876, a particular set of intents/actions 874, and a particular personalized lexicon 886. The grammar databases 876, and intents/actions 874 may be stored in an NLU storage 873. Each gazetteer 884 may include domain/skill-indexed lexical information associated with a particular user and/or device 110. For example, a Gazetteer A (884a) includes skill-indexed lexical information 886aa to 886an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 862 applies grammar information 876 and lexical information 886 associated with a domain (associated with the recognizer 863 implementing the NER component 862) to determine a mention of one or more entities in text data. In this manner, the NER component 862 identifies "slots" (each corresponding to one or more particular words in text data) that may be useful for later processing. The NER component 862 may also label each slot with a type (e.g., noun, place, city, artist name, song name, etc.).

Each grammar database 876 includes the names of entities (i.e., nouns) commonly found in speech about the particular domain to which the grammar database 876 relates, whereas the lexical information 886 is personalized to the user and/or the device 110 from which the user input originated. For example, a grammar database 876 associated with a shopping domain may include a database of words commonly used when people discuss shopping.

A downstream process called entity resolution (discussed in detail elsewhere herein) links a slot of text data to a specific entity known to the system. To perform entity resolution, the NLU component 160 may utilize gazetteer information (884a-884n) stored in an entity library storage 882. The gazetteer information 884 may be used to match text data (representing a portion of the user input) with text data representing known entities, such as song titles, contact names, etc. Gazetteers 884 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 863 may also include an intent classification (IC) component 864. An IC component 864 parses text data to determine an intent(s) (associated with the domain associated with the recognizer 863 implementing the IC component 864) that potentially represents the user input. An intent represents to an action a user desires be performed. An IC component 864 may communicate with a database 874 of words linked to intents. For example, a music intent database may link words and phrases such as "quiet," "volume off," and "mute" to a <Mute> intent. An IC component 864 identifies potential intents by comparing words and phrases in text data (representing at least a portion of the user input) to the words and phrases in an intents database 874 (associated with the domain that is associated with the recognizer 863 implementing the IC component 864).

The intents identifiable by a specific IC component 864 are linked to domain-specific (i.e., the domain associated with the recognizer 863 implementing the IC component 864) grammar frameworks 876 with "slots" to be filled. Each slot of a grammar framework 876 corresponds to a portion of text data that the system believes corresponds to an entity. For example, a grammar framework 876 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886 (associated with the domain associated with the recognizer 863 implementing the NER component 862), attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as Hidden Markov Models, maximum entropy models, log linear models, conditional random fields (CRF), and the like. For example, an NER component 862 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb based on a word database associated with the music domain, which an IC component 864 (also implemented by the music domain recognizer) may determine corresponds to a <PlayMusic> intent. At this stage, no determination has been made as to the meaning of "mother's little helper" or "the rolling stones," but based on grammar rules and models, the NER component 862 has determined the text of these phrases relates to the grammatical object (i.e., entity) of the user input represented in the text data.

An NER component 862 may tag text data to attribute meaning thereto. For example, an NER component 862 may tag "play mother's little helper by the rolling stones" as: {domain} Music, {intent}<PlayMusic>, {artist name} rolling stones, {media type} SONG, and {song title} mother's little helper. For further example, the NER component 862 may tag "play songs by the rolling stones" as: {domain} Music, {intent}<PlayMusic>, {artist name} rolling stones, and {media type} SONG.

The shortlister component 850 may receive ASR output data 710 output from the ASR component 150 or output from the device 110b (as illustrated in FIG. 9). The ASR component 150 may embed the ASR output data 710 into a form processable by a trained model(s) using sentence embedding techniques as known in the art. Sentence embedding results in the ASR output data 710 including text in a structure that enables the trained models of the shortlister component 850 to operate on the ASR output data 710. For example, an embedding of the ASR output data 710 may be a vector representation of the ASR output data 710.

The shortlister component 850 may make binary determinations (e.g., yes or no) regarding which domains relate to the ASR output data 710. The shortlister component 850 may make such determinations using the one or more trained models described herein above. If the shortlister component 850 implements a single trained model for each domain, the shortlister component 850 may simply run the models that are associated with enabled domains as indicated in a user profile associated with the device 110 and/or user that originated the user input.

The shortlister component 850 may generate n-best list data 915 representing domains that may execute with respect to the user input represented in the ASR output data 710. The size of the n-best list represented in the n-best list data 915 is configurable. In an example, the n-best list data 915 may indicate every domain of the system as well as contain an indication, for each domain, regarding whether the domain is likely capable to execute the user input represented in the ASR output data 710. In another example, instead of indicating every domain of the system, the n-best list data 915 may only indicate the domains that are likely to be able to execute the user input represented in the ASR output data 710. In yet another example, the shortlister component 850 may implement thresholding such that the n-best list data 915 may indicate no more than a maximum number of domains that may execute the user input represented in the ASR output data 710. In an example, the threshold number of domains that may be represented in the n-best list data 915 is ten. In another example, the domains included in the n-best list data 915 may be limited by a threshold a score, where only domains indicating a likelihood to handle the user input is above a certain score (as determined by processing the ASR output data 710 by the shortlister component 850 relative to such domains) are included in the n-best list data 915.

The ASR output data 710 may correspond to more than one ASR hypothesis. When this occurs, the shortlister component 850 may output a different n-best list (represented in the n-best list data 915) for each ASR hypothesis. Alternatively, the shortlister component 850 may output a single n-best list representing the domains that are related to the multiple ASR hypotheses represented in the ASR output data 710.

As indicated above, the shortlister component 850 may implement thresholding such that an n-best list output therefrom may include no more than a threshold number of entries. If the ASR output data 710 includes more than one ASR hypothesis, the n-best list output by the shortlister component 850 may include no more than a threshold number of entries irrespective of the number of ASR hypotheses output by the ASR component 150. Alternatively or in addition, the n-best list output by the shortlister component 850 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 710, the shortlister component 850 may generate confidence scores representing likelihoods that domains relate to the ASR output data 710. If the shortlister component 850 implements a different trained model for each domain, the shortlister component 850 may generate a different confidence score for each individual domain trained model that is run. If the shortlister component 850 runs the models of every domain when ASR output data 710 is received, the shortlister component 850 may generate a different confidence score for each domain of the system. If the shortlister component 850 runs the models of only the domains that are associated with skills indicated as enabled in a user profile associated with the device 110 and/or user that originated the user input, the shortlister component 850 may only generate a different confidence score for each domain associated with at least one enabled skill. If the shortlister component 850 implements a single trained model with domain specifically trained portions, the shortlister component 850 may generate a different confidence score for each domain who's specifically trained portion is run. The shortlister component 850 may perform matrix vector modification to obtain confidence scores for all domains of the system in a single instance of processing of the ASR output data 710.

N-best list data 915 including confidence scores that may be output by the shortlister component 850 may be represented as, for example:

Search domain, 0.67
Recipe domain, 0.62
Information domain, 0.57
Shopping domain, 0.42

As indicated, the confidence scores output by the shortlister component 850 may be numeric values. The confidence scores output by the shortlister component 850 may alternatively be binned values (e.g., high, medium, low).

The n-best list may only include entries for domains having a confidence score satisfying (e.g., equaling or exceeding) a minimum threshold confidence score. Alternatively, the shortlister component 850 may include entries for all domains associated with user enabled skills, even if one or more of the domains are associated with confidence scores that do not satisfy the minimum threshold confidence score.

The shortlister component 850 may consider other data 920 when determining which domains may relate to the user input represented in the ASR output data 710 as well as respective confidence scores. The other data 920 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 920 may include an indicator of the user associated with the ASR output data 710, for example as determined by a user recognition component.

The other data 920 may be character embedded prior to being input to the shortlister component 850. The other data 920 may alternatively be embedded using other techniques known in the art prior to being input to the shortlister component 850.

The other data 920 may also include data indicating the domains associated with skills that are enabled with respect to the device 110 and/or user that originated the user input. The shortlister component 850 may use such data to determine which domain-specific trained models to run. That is, the shortlister component 850 may determine to only run the trained models associated with domains that are associated with user-enabled skills. The shortlister component 850 may alternatively use such data to alter confidence scores of domains.

As an example, considering two domains, a first domain associated with at least one enabled skill and a second domain not associated with any user-enabled skills of the user that originated the user input, the shortlister component 850 may run a first model specific to the first domain as well as a second model specific to the second domain. Alternatively, the shortlister component 850 may run a model configured to determine a score for each of the first and second domains. The shortlister component 850 may determine a same confidence score for each of the first and second domains in the first instance. The shortlister component 850 may then alter those confidence scores based on which domains is associated with at least one skill enabled by the present user. For example, the shortlister component 850 may increase the confidence score associated with the domain associated with at least one enabled skill while leaving the confidence score associated with the other domain the same. Alternatively, the shortlister component 850 may leave the confidence score associated with the domain associated with at least one enabled skill the same while decreasing the confidence score associated with the other domain. Moreover, the shortlister component 850 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 170. When the shortlister component 850 receives the ASR output data 710, the shortlister component 850 may determine whether profile data associated with the user and/or device 110 that originated the command includes an indication of enabled skills.

The other data 920 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 850 may use such data to determine which domain-specific trained models to run. For example, if the device 110 corresponds to a displayless type device, the shortlister component 850 may determine not to run trained models specific to domains that output video data. The shortlister component 850 may alternatively use such data to alter confidence scores of domains.

As an example, considering two domains, one that outputs audio data and another that outputs video data, the shortlister component 850 may run a first model specific to the domain that generates audio data as well as a second model specific to the domain that generates video data. Alternatively the shortlister component 850 may run a model configured to determine a score for each domain. The shortlister component 850 may determine a same confidence score for each of the domains in the first instance. The shortlister component 850 may then alter the original confidence scores based on the type of the device 110 that originated the user input corresponding to the ASR output data 710. For example, if the device 110 is a displayless device, the shortlister component 850 may increase the confidence score associated with the domain that generates audio data while leaving the confidence score associated with the domain that generates video data the same. Alternatively, if the device 110 is a displayless device, the shortlister component 850 may leave the confidence score associated with the domain that generates audio data the same while decreasing the confidence score associated with the domain that generates video data. Moreover, if the device 110 is a displayless device, the shortlister component 850 may increase the confidence score associated with the domain that generates audio data as well as decrease the confidence score associated with the domain that generates video data.

The type of device information represented in the other data 920 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 920 may represent the smart TV of other display device, and not the displayless device that captured the spoken user input.

The other data 920 may also include data indicating the user input originating device's speed, location, or other mobility information. For example, the device may correspond to a vehicle including a display. If the vehicle is moving, the shortlister component 850 may decrease the confidence score associated with a domain that generates video data as it may be undesirable to output video content to a user while the user is driving. The device may output data to the system(s) 120 indicating when the device is moving.

The other data 920 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 850 may use such data to alter confidence scores of domains. For example, the shortlister component 850 may run a first model specific to a first domain as well as a second model specific to a second domain. Alternatively, the shortlister component 850 may run a model configured to determine a score for each domain. The shortlister component 850 may also determine a same confidence score for each of the domains in the first instance. The shortlister component 850 may then alter the original confidence scores based on the first domain being invoked to cause the system to output content while the current user input was received. Based on the first domain being invoked, the shortlister component 850 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 915 generated by the shortlister component 850 as well as the different types of other data 920 considered by the shortlister component 850 are configurable. For example, the shortlister component 850 may update confidence scores as more other data 920 is considered. For further example, the n-best list data 915 may exclude relevant domains if thresholding is implemented. Thus, for example, the shortlister component 850 may include an indication of a domain in the n-best list 915 unless the shortlister component 850 is one hundred percent confident that the domain may not execute the user input represented in the ASR output data 710 (e.g., the shortlister component 850 determines a confidence score of zero for the domain).

The shortlister component 850 may send the ASR output data 710 to recognizers 863 associated with domains represented in the n-best list data 915. Alternatively, the shortlister component 850 may send the n-best list data 915 or some other indicator of the selected subset of domains to another component (such as the orchestrator component 130) which may in turn send the ASR output data 710 to the recognizers 863 corresponding to the domains included in the n-best list data 915 or otherwise indicated in the indicator. If the shortlister component 850 generates an n-best list representing domains without any associated confidence scores, the shortlister component 850/orchestrator component 130 may send the ASR output data 710 to recognizers 863 associated with domains that the shortlister component 850 determines may execute the user input. If the shortlister component 850 generates an n-best list representing domains with associated confidence scores, the shortlister component 850/orchestrator component 130 may send the ASR output data 710 to recognizers 863 associated with domains associated with confidence scores satisfying (e.g., meeting or exceeding) a threshold minimum confidence score.

A recognizer 863 may output tagged text data generated by an NER component 862 and an IC component 864, as described herein above. The NLU component 160 may compile the output tagged text data of the recognizers 863 into a single cross-domain n-best list 940 and may send the cross-domain n-best list 940 to a pruning component 950. Each entry of tagged text (e.g., each NLU hypothesis) represented in the cross-domain n-best list data 940 may be associated with a respective score indicating a likelihood that the NLU hypothesis corresponds to the domain associated with the recognizer 863 from which the NLU hypothesis was output. For example, the cross-domain n-best list data 940 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 950 may sort the NLU hypotheses represented in the cross-domain n-best list data 940 according to their respective scores. The pruning component 950 may perform score thresholding with respect to the cross-domain NLU hypotheses. For example, the pruning component 950 may select NLU hypotheses associated with scores satisfying (e.g., meeting and/or exceeding) a threshold score. The pruning component 950 may also or alternatively perform number of NLU hypothesis thresholding. For example, the pruning component 950 may select the top scoring NLU hypothesis(es). The pruning component 950 may output a portion of the NLU hypotheses input thereto. The purpose of the pruning component 950 is to create a reduced list of NLU hypotheses so that downstream, more resource intensive, processes may only operate on the NLU hypotheses that most likely represent the user's intent.

The NLU component 160 may include a light slot filler component 952. The light slot filler component 952 can take text from slots represented in the NLU hypotheses output by the pruning component 950 and alter them to make the text more easily processed by downstream components. The light slot filler component 952 may perform low latency operations that do not involve heavy operations such as reference to a knowledge base (e.g., 872. The purpose of the light slot filler component 952 is to replace words with other words or values that may be more easily understood by downstream components. For example, if a NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-domain n-best list data 960.

The cross-domain n-best list data 960 may be input to an entity resolution component 970. The entity resolution component 970 can apply rules or other instructions to standardize labels or tokens from previous stages into an intent/slot representation. The precise transformation may depend on the domain. For example, for a travel domain, the entity resolution component 970 may transform text corresponding to "Boston airport" to the standard BOS three-letter code referring to the airport. The entity resolution component 970 can refer to a knowledge base (e.g., 872) that is used to specifically identify the precise entity referred to in each slot of each NLU hypothesis represented in the cross-domain n-best list data 960. Specific intent/slot combinations may also be tied to a particular source, which may then be used to resolve the text. In the example "play songs by the stones," the entity resolution component 970 may reference a personal music catalog, Amazon Music account, a user profile, or the like. The entity resolution component 970 may output an altered n-best list that is based on the cross-domain n-best list 960 but that includes more detailed information (e.g., entity IDs) about the specific entities mentioned in the slots and/or more detailed slot data that can eventually be used by a skill. The NLU component 160 may include multiple entity resolution components 970 and each entity resolution component 970 may be specific to one or more domains.

The NLU component 160 may include a reranker 990. The reranker 990 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 970.

The reranker 990 may apply re-scoring, biasing, or other techniques. The reranker 990 may consider not only the data output by the entity resolution component 970, but may also consider other data 991. The other data 991 may include a variety of information. For example, the other data 991 may include skill rating or popularity data. For example, if one skill has a high rating, the reranker 990 may increase the score of a NLU hypothesis that may be processed by the skill. The other data 991 may also include information about skills that have been enabled by the user that originated the user input. For example, the reranker 990 may assign higher scores to NLU hypothesis that may be processed by enabled skills than NLU hypothesis that may be processed by non-enabled skills. The other data 991 may also include data indicating user usage history, such as if the user that originated the user input regularly uses a particular skill or does so at particular times of day. The other data 991 may additionally include data indicating date, time, location, weather, type of device 110, user identifier, context, as well as other information. For example, the reranker 990 may consider when any particular skill is currently active (e.g., music being played, a game being played, etc.).

As illustrated and described, the entity resolution component 970 is implemented prior to the reranker 990. The entity resolution component 970 may alternatively be implemented after the reranker 990. Implementing the entity resolution component 970 after the reranker 990 limits the NLU hypotheses processed by the entity resolution component 970 to only those hypotheses that successfully pass through the reranker 990.

The reranker 990 may be a global reranker (e.g., one that is not specific to any particular domain). Alternatively, the NLU component 160 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 160 may perform NLU processing described above with respect to domains associated with skills wholly implemented as part of the system(s) 120 (e.g., designated 190 in FIG. 1A). The NLU component 160 may separately perform NLU processing described above with respect to domains associated with skills that are at least partially implemented as part of the skill system(s) 125. In an example, the shortlister component 850 may only process with respect to these latter domains. Results of these two NLU processing paths may be merged into NLU output data 985, which may be sent to a post-NLU ranker 965, which may be implemented by the system(s) 120.

The post-NLU ranker 965 may include a statistical component that produces a ranked list of intent/skill pairs with associated confidence scores. Each confidence score may indicate an adequacy of the skill's execution of the intent with respect to NLU results data associated with the skill. The post-NLU ranker 965 may operate one or more trained models configured to process the NLU results data 985, skill result data 930, and the other data 920 in order to output ranked output data 925. The ranked output data 925 may include an n-best list where the NLU hypotheses in the NLU results data 985 are reordered such that the n-best list in the ranked output data 925 represents a prioritized list of skills to respond to a user input as determined by the post-NLU ranker 965. The ranked output data 925 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 965 enables the system to better determine the best skill to execute the user input. For example, first and second NLU hypotheses in the NLU results data 985 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 965 (or other scheduling component such as orchestrator component 130) may solicit the first skill and the second skill to provide potential result data 930 based on the first NLU hypothesis and the second NLU hypothesis, respectively. For example, the post-NLU ranker 965 may send the first NLU hypothesis to the first skill 190a along with a request for the first skill 190*a* to at least partially execute with respect to the first NLU hypothesis. The post-NLU ranker 965 may also send the second NLU hypothesis to the second skill 190*b* along with a request for the second skill 190*b* to at least partially execute with respect to the second NLU hypothesis. The post-NLU ranker 965 receives, from the first skill 190*a*, first result data 930*a* generated from the first skill 190*a*'s execution with respect to the first NLU hypothesis. The post-NLU ranker 965 also receives, from the second skill 190*b*, second results data 930*b* generated from the second skill 190*b*'s execution with respect to the second NLU hypothesis.

The result data 930 may include various portions. For example, the result data 930 may include content (e.g., audio data, text data, and/or video data) to be output to a user. The result data 930 may also include a unique identifier used by the system(s) 120 and/or the skill system(s) 125 to locate the data to be output to a user. The result data 930 may also include an instruction. For example, if the user input corresponds to "turn on the light," the result data 930 may include an instruction causing the system to turn on a light associated with a profile of the device (110*a*/110*b*) and/or user.

The post-NLU ranker 965 may consider the first result data 930*a* and the second result data 930*b* to alter the first confidence score and the second confidence score of the first NLU hypothesis and the second NLU hypothesis, respectively. That is, the post-NLU ranker 965 may generate a third confidence score based on the first result data 930*a* and the first confidence score. The third confidence score may correspond to how likely the post-NLU ranker 965 determines the first skill will correctly respond to the user input. The post-NLU ranker 965 may also generate a fourth confidence score based on the second result data 930*b* and the second confidence score. One skilled in the art will appreciate that a first difference between the third confidence score and the fourth confidence score may be greater than a second difference between the first confidence score and the second confidence score. The post-NLU ranker 965 may also consider the other data 920 to generate the third confidence score and the fourth confidence score. While it has been described that the post-NLU ranker 965 may alter the confidence scores associated with first and second NLU hypotheses, one skilled in the art will appreciate that the post-NLU ranker 965 may alter the confidence scores of more than two NLU hypotheses. The post-NLU ranker 965 may select the result data 930 associated with the skill 190 with the highest altered confidence score to be the data output in response to the current user input. The post-NLU ranker 965 may also consider the ASR output data 710 to alter the NLU hypotheses confidence scores.

The orchestrator component 130 may, prior to sending the NLU results data 985 to the post-NLU ranker 965, associate intents in the NLU hypotheses with skills 190. For example, if a NLU hypothesis includes a <PlayMusic> intent, the orchestrator component 130 may associate the NLU hypothesis with one or more skills 190 that can execute the <PlayMusic> intent. Thus, the orchestrator component 130 may send the NLU results data 985, including NLU hypotheses paired with skills 190, to the post-NLU ranker 965. In response to ASR output data 710 corresponding to "what should I do for dinner today," the orchestrator component 130 may generates pairs of skills 190 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 965 queries each skill 190, paired with a NLU hypothesis in the NLU output data 985, to provide result data 930 based on the NLU hypothesis with which it is associated. That is, with respect to each skill, the post-NLU ranker 965 colloquially asks the each skill "if given this NLU hypothesis, what would you do with it." According to the above example, the post-NLU ranker 965 may send skills 190 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 965 may query each of the skills 190 in parallel or substantially in parallel.

A skill 190 may provide the post-NLU ranker 965 with various data and indications in response to the post-NLU ranker 965 soliciting the skill 190 for result data 930. A skill 190 may simply provide the post-NLU ranker 965 with an indication of whether or not the skill can execute with respect to the NLU hypothesis it received. A skill 190 may also or alternatively provide the post-NLU ranker 965 with output data generated based on the NLU hypothesis it received. In some situations, a skill 190 may need further information in addition to what is represented in the received NLU hypothesis to provide output data responsive to the user input. In these situations, the skill 190 may provide the post-NLU ranker 965 with result data 930 indicating slots of a framework that the skill 190 further needs filled or entities that the skill 190 further needs resolved prior to the skill 190 being able to provided result data 930 responsive to the user input. The skill 190 may also provide the post-NLU ranker 965 with an instruction and/or computer-generated speech indicating how the skill 190 recommends the system solicit further information needed by the skill 190. The skill 190 may further provide the post-NLU ranker 965 with an indication of whether the skill 190 will have all needed information after the user provides additional information a single time, or whether the skill 190 will need the user to provide various kinds of additional information prior to the skill 190 having all needed information. According to the above example, skills 190 may provide the post-NLU ranker 965 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 930 includes an indication provided by a skill 190 indicating whether or not the skill 190 can execute with respect to a NLU hypothesis; data generated by a skill 190 based on a NLU hypothesis; as well as an indication provided by a skill 190 indicating the skill 190 needs further information in addition to what is represented in the received NLU hypothesis.

The post-NLU ranker 965 uses the result data 930 provided by the skills 190 to alter the NLU processing confidence scores generated by the reranker 990. That is, the post-NLU ranker 965 uses the result data 930 provided by the queried skills 190 to create larger differences between the NLU processing confidence scores generated by the reranker 990. Without the post-NLU ranker 965, the system may not be confident enough to determine an output in response to a user input, for example when the NLU hypotheses associated with multiple skills are too close for the system to confidently determine a single skill 190 to invoke to respond to the user input. For example, if the system does not implement the post-NLU ranker 965, the system may not be able to determine whether to obtain output data from a general reference information skill or a medical information skill in response to a user input corresponding to "what is acne."

The post-NLU ranker 965 may prefer skills 190 that provide result data 930 responsive to NLU hypotheses over skills 190 that provide result data 930 corresponding to an indication that further information is needed, as well as skills 190 that provide result data 930 indicating they can provide multiple responses to received NLU hypotheses. For example, the post-NLU ranker 965 may generate a first score for a first skill 190a that is greater than the first skill's NLU confidence score based on the first skill 190a providing result data 930a including a response to a NLU hypothesis. For further example, the post-NLU ranker 965 may generate a second score for a second skill 190b that is less than the second skill's NLU confidence score based on the second skill 190b providing result data 930b indicating further information is needed for the second skill 190b to provide a response to a NLU hypothesis. Yet further, for example, the post-NLU ranker 965 may generate a third score for a third skill 190c that is less than the third skill's NLU confidence score based on the third skill 190c providing result data 930c indicating the third skill 190c can provide multiple responses to a NLU hypothesis.

The post-NLU ranker 965 may consider other data 920 in determining scores. The other data 920 may include rankings associated with the queried skills 190. A ranking may be a system ranking or a user-specific ranking. A ranking may indicate a veracity of a skill from the perspective of one or more users of the system. For example, the post-NLU ranker 965 may generate a first score for a first skill 190a that is greater than the first skill's NLU processing confidence score based on the first skill 190a being associated with a high ranking. For further example, the post-NLU ranker 965 may generate a second score for a second skill 190b that is less than the second skill's NLU processing confidence score based on the second skill 190b being associated with a low ranking.

The other data 920 may include information indicating whether or not the user that originated the user input has enabled one or more of the queried skills 190. For example, the post-NLU ranker 965 may generate a first score for a first skill 190a that is greater than the first skill's NLU processing confidence score based on the first skill 190a being enabled by the user that originated the user input. For further example, the post-NLU ranker 965 may generate a second score for a second skill 190b that is less than the second skill's NLU processing confidence score based on the second skill 190b not being enabled by the user that originated the user input. When the post-NLU ranker 965 receives the NLU results data 985, the post-NLU ranker 965 may determine whether profile data, associated with the user and/or device that originated the user input, includes indications of enabled skills.

The other data 920 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 965 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 965 may increase the NLU processing confidence score associated with a first skill configured to output visual data and/or decrease the NLU processing confidence score associated with a second skill configured to output audio data.

The other data 920 may include information indicating the veracity of the result data 930 provided by a skill 190. For example, if a user says "tell me a recipe for pasta sauce," a first skill 190a may provide the post-NLU ranker 965 with first result data 930a corresponding to a first recipe associated with a five star rating and a second skill 190b may provide the post-NLU ranker 965 with second result data 930b corresponding to a second recipe associated with a one star rating. In this situation, the post-NLU ranker 965 may increase the NLU processing confidence score associated with the first skill 190a based on the first skill 190a providing the first result data 930a associated with the five star rating and/or decrease the NLU processing confidence score associated with the second skill 190b based on the second skill 190b providing the second result data 930b associated with the one star rating.

The other data 920 may include information indicating the type of device that originated the user input. For example, the device may correspond to a "hotel room" type if the device is located in a hotel room. If a user inputs a command corresponding to "order me food" to the device located in the hotel room, the post-NLU ranker 965 may increase the NLU processing confidence score associated with a first skill 190a corresponding to a room service skill associated with the hotel and/or decrease the NLU processing confidence score associated with a second skill 190b corresponding to a food skill not associated with the hotel.

The other data 920 may include information indicating a location of the device and/or user that originated the user input. The system may be configured with skills 190 that may only operate with respect to certain geographic locations. For example, a user may provide a user input corresponding to "when is the next train to Portland." A first skill 190a may operate with respect to trains that arrive at, depart from, and pass through Portland, Oregon. A second skill 190b may operate with respect to trains that arrive at, depart from, and pass through Portland, Maine. If the device and/or user that originated the user input is located in Seattle, Washington, the post-NLU ranker 965 may increase the NLU processing confidence score associated with the first skill 190a and/or decrease the NLU processing confidence score associated with the second skill 190b. Likewise, if the device and/or user that originated the user input is located in Boston, Massachusetts, the post-NLU ranker 965 may increase the NLU processing confidence score associated with the second skill 190b and/or decrease the NLU processing confidence score associated with the first skill 190a.

The other data 920 may include information indicating a time of day. The system may be configured with skills 190 that operate with respect to certain times of day. For example, a user may provide a user input corresponding to "order me food." A first skill 190a may generate first result data 930a corresponding to breakfast. A second skill 190b may generate second result data 930b corresponding to dinner. If the system(s) 120 receives the user input in the morning, the post-NLU ranker 965 may increase the NLU processing confidence score associated with the first skill 190*a* and/or decrease the NLU processing score associated with the second skill 190*b*. If the system(s) 120 receives the user input in the afternoon or evening, the post-NLU ranker 965 may increase the NLU processing confidence score associated with the second skill 190*b* and/or decrease the NLU processing confidence score associated with the first skill 190*a*.

The other data 920 may include information indicating user preferences. The system may include multiple skills 190 configured to execute in substantially the same manner. For example, a first skill 190*a* and a second skill 190*b* may both be configured to order food from respective restaurants. The system may store a user preference (e.g., in the profile storage 170) that is associated with the user that provided the user input to the system(s) 120 as well as indicates the user prefers the first skill 190*a* over the second skill 190*b*. Thus, when the user provides a user input that may be executed by both the first skill 190*a* and the second skill 190*b*, the post-NLU ranker 965 may increase the NLU processing confidence score associated with the first skill 190*a* and/or decrease the NLU processing confidence score associated with the second skill 190*b*.

The other data 920 may include information indicating system usage history associated with the user that originated the user input. For example, the system usage history may indicate the user originates user inputs that invoke a first skill 190*a* more often than the user originates user inputs that invoke a second skill 190*b*. Based on this, if the present user input may be executed by both the first skill 190*a* and the second skill 190*b*, the post-NLU ranker 965 may increase the NLU processing confidence score associated with the first skill 190*a* and/or decrease the NLU processing confidence score associated with the second skill 190*b*.

The other data 920 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 965 may increase the NLU processing confidence score associated with a first skill 190*a* that generates audio data. The post-NLU ranker 965 may also or alternatively decrease the NLU processing confidence score associated with a second skill 190*b* that generates image data or video data.

The other data 920 may include information indicating how long it took a skill 190 to provide result data 930 to the post-NLU ranker 965. When the post-NLU ranker 965 multiple skills 190 for result data 930, the skills 190 may respond to the queries at different speeds. The post-NLU ranker 965 may implement a latency budget. For example, if the post-NLU ranker 965 determines a skill 190 responds to the post-NLU ranker 965 within a threshold amount of time from receiving a query from the post-NLU ranker 965, the post-NLU ranker 965 may increase the NLU processing confidence score associated with the skill 190. Conversely, if the post-NLU ranker 965 determines a skill 190 does not respond to the post-NLU ranker 965 within a threshold amount of time from receiving a query from the post-NLU ranker 965, the post-NLU ranker 965 may decrease the NLU processing confidence score associated with the skill 190.

It has been described that the post-NLU ranker 965 uses the other data 920 to increase and decrease NLU processing confidence scores associated with various skills 190 that the post-NLU ranker 965 has already requested result data from. Alternatively, the post-NLU ranker 965 may use the other data 920 to determine which skills 190 to request result data from. For example, the post-NLU ranker 965 may use the other data 920 to increase and/or decrease NLU processing confidence scores associated with skills 190 associated with the NLU results data 985 output by the NLU component 160. The post-NLU ranker 965 may select n-number of top scoring altered NLU processing confidence scores. The post-NLU ranker 965 may then request result data 930 from only the skills 190 associated with the selected n-number of NLU processing confidence scores.

As described, the post-NLU ranker 965 may request result data 930 from all skills 190 associated with the NLU results data 985 output by the NLU component 160. Alternatively, the system(s) 120 may prefer result data 930 from skills implemented entirely by the system(s) 120 rather than skills at least partially implemented by the skill system(s) 125. Therefore, in the first instance, the post-NLU ranker 965 may request result data 930 from only skills associated with the NLU results data 985 and entirely implemented by the system(s) 120. The post-NLU ranker 965 may only request result data 930 from skills associated with the NLU results data 985, and at least partially implemented by the skill system(s) 125, if none of the skills, wholly implemented by the system(s) 120, provide the post-NLU ranker 965 with result data 930 indicating either data response to the NLU results data 985, an indication that the skill can execute the user input, or an indication that further information is needed.

As indicated above, the post-NLU ranker 965 may request result data 930 from multiple skills 190. If one of the skills 190 provides result data 930 indicating a response to a NLU hypothesis and the other skills provide result data 930 indicating either they cannot execute or they need further information, the post-NLU ranker 965 may select the result data 930 including the response to the NLU hypothesis as the data to be output to the user. If more than one of the skills 190 provides result data 930 indicating responses to NLU hypotheses, the post-NLU ranker 965 may consider the other data 920 to generate altered NLU processing confidence scores, and select the result data 930 of the skill associated with the greatest score as the data to be output to the user.

A system that does not implement the post-NLU ranker 965 may select the highest scored NLU hypothesis in the NLU results data 985. The system may send the NLU hypothesis to a skill 190 associated therewith along with a request for output data. In some situations, the skill 190 may not be able to provide the system with output data. This results in the system indicating to the user that the user input could not be processed even though another skill associated with lower ranked NLU hypothesis could have provided output data responsive to the user input.

The post-NLU ranker 965 reduces instances of the aforementioned situation. As described, the post-NLU ranker 965 queries multiple skills associated with the NLU results data 985 to provide result data 930 to the post-NLU ranker 965 prior to the post-NLU ranker 965 ultimately determining the skill 190 to be invoked to respond to the user input. Some of the skills 190 may provide result data 930 indicating responses to NLU hypotheses while other skills 190 may providing result data 930 indicating the skills cannot provide responsive data. Whereas a system not implementing the post-NLU ranker 965 may select one of the skills 190 that could not provide a response, the post-NLU ranker 965 only selects a skill 190 that provides the post-NLU ranker 965 with result data corresponding to a response, indicating further information is needed, or indicating multiple responses can be generated.

The post-NLU ranker 965 may select result data 930, associated with the skill 190 associated with the highest score, for output to the user. Alternatively, the post-NLU ranker 965 may output ranked output data 925 indicating skills 190 and their respective post-NLU ranker rankings. Since the post-NLU ranker 965 receives result data 930, potentially corresponding to a response to the user input, from the skills 190 prior to post-NLU ranker 965 selecting one of the skills or outputting the ranked output data 925, little to no latency occurs from the time skills provide result data 930 and the time the system outputs responds to the user.

If the post-NLU ranker 965 selects result audio data to be output to a user and the system determines content should be output audibly, the post-NLU ranker 965 (or another component of the system(s) 120) may cause the device 110a and/or the device 110b to output audio corresponding to the result audio data. If the post-NLU ranker 965 selects result text data to output to a user and the system determines content should be output visually, the post-NLU ranker 965 (or another component of the system(s) 120) may cause the device 110b to display text corresponding to the result text data. If the post-NLU ranker 965 selects result audio data to output to a user and the system determines content should be output visually, the post-NLU ranker 965 (or another component of the system(s) 120) may send the result audio data to the ASR component 150. The ASR component 150 may generate output text data corresponding to the result audio data. The system(s) 120 may then cause the device 110b to display text corresponding to the output text data. If the post-NLU ranker 965 selects result text data to output to a user and the system determines content should be output audibly, the post-NLU ranker 965 (or another component of the system(s) 120) may send the result text data to the TTS component 180. The TTS component 180 may generate output audio data (corresponding to computer-generated speech) based on the result text data. The system(s) 120 may then cause the device 110a and/or the device 110b to output audio corresponding to the output audio data.

As described, a skill 190 may provide result data 930 either indicating a response to the user input, indicating more information is needed for the skill 190 to provide a response to the user input, or indicating the skill 190 cannot provide a response to the user input. If the skill 190 associated with the highest post-NLU ranker score provides the post-NLU ranker 965 with result data 930 indicating a response to the user input, the post-NLU ranker 965 (or another component of the system(s) 120, such as the orchestrator component 130) may simply cause content corresponding to the result data 930 to be output to the user. For example, the post-NLU ranker 965 may send the result data 930 to the orchestrator component 130. The orchestrator component 130 may cause the result data 930 to be sent to the device (110a/110b), which may output audio and/or display text corresponding to the result data 930. The orchestrator component 130 may send the result data 930 to the ASR component 150 to generate output text data and/or may send the result data 930 to the TTS component 180 to generate output audio data, depending on the situation.

The skill 190 associated with the highest post-NLU ranker score may provide the post-NLU ranker 965 with result data 930 indicating more information is needed as well as instruction data. The instruction data may indicate how the skill 190 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 965 may simply cause the received instruction data be output by the device (110a/110b). Alternatively, the instruction data may be in a format that is not capable of being output by the device (110a/110b). When this occurs, the post-NLU ranker 965 may cause the ASR component 150 or the TTS component 180 to process the instruction data, depending on the situation, to generate instruction data that may be output by the device (110a/110b). Once the user provides the system with all further information needed by the skill 190, the skill 190 may provide the system with result data 930 indicating a response to the user input, which may be output by the system as detailed above.

The system may include "informational" skills 190 that simply provide the system with information, which the system outputs to the user. The system may also include "transactional" skills 190 that require a system instruction to execute the user input. Transactional skills 190 include ride sharing skills, flight booking skills, etc. A transactional skill 190 may simply provide the post-NLU ranker 965 with result data 930 indicating the transactional skill 190 can execute the user input. The post-NLU ranker 965 may then cause the system to solicit the user for an indication that the system is permitted to cause the transactional skill 190 to execute the user input. The user-provided indication may be an audible indication or a tactile indication (e.g., activation of a virtual button or input of text via a virtual keyboard). In response to receiving the user-provided indication, the system may provide the transactional skill 190 with data corresponding to the indication. In response, the transactional skill 190 may execute the command (e.g., book a flight, book a train ticket, etc.). Thus, while the system may not further engage an informational skill 190 after the informational skill 190 provides the post-NLU ranker 965 with result data 930, the system may further engage a transactional skill 190 after the transactional skill 190 provides the post-NLU ranker 965 with result data 930 indicating the transactional skill 190 may execute the user input.

In some instances, the post-NLU ranker 965 may generate respective scores for first and second skills that are too close (e.g., are not different by at least a threshold difference) for the post-NLU ranker 965 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 130, post-NLU ranker 965, shortlister component 850, or other component may be trained and operated according to various machine learning techniques.

Figure 10:
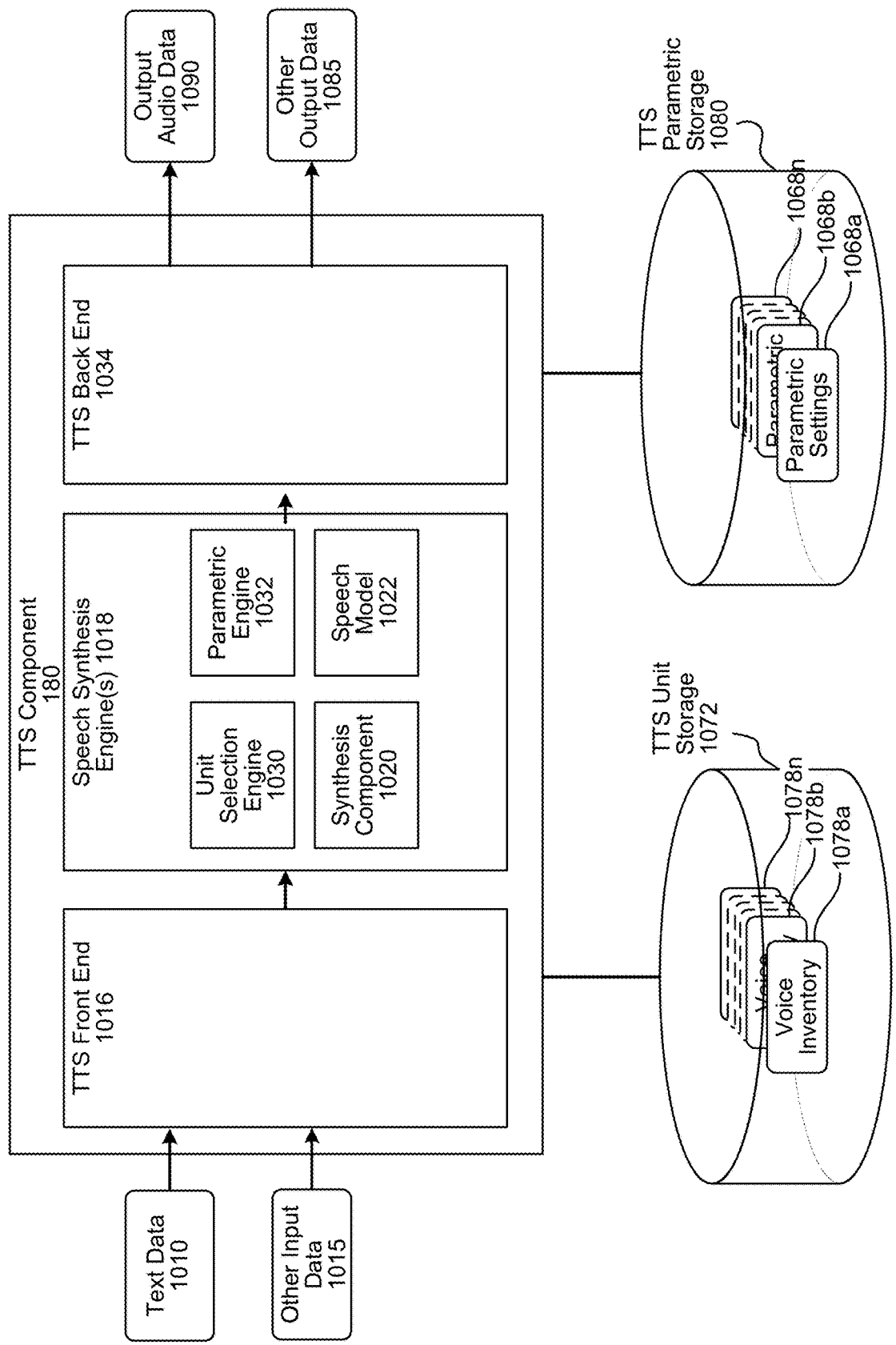
FIG. 10 is a conceptual diagram of text-to-speech components according to embodiments of the present disclosure.

Components of a system that may be used to perform unit selection, parametric TTS processing, and/or model-based audio synthesis are shown in FIG. 10. As shown in FIG. 10, the TTS component/processor 180 may include a TTS front end 1016, a speech synthesis engine 1018, TTS unit storage 1072, TTS parametric storage 1080, and a TTS back end 1034. The TTS unit storage 1072 may include, among other things, voice inventories 1078*a*-1078*n* that may include pre-recorded audio segments (called units) to be used by the unit selection engine 1030 when performing unit selection synthesis as described below. The TTS parametric storage 1080 may include, among other things, parametric settings 1068*a*-1068*n* that may be used by the parametric synthesis engine 1032 when performing parametric synthesis as described below. A particular set of parametric settings 1068 may correspond to a particular voice profile (e.g., whispered speech, excited speech, etc.).

In various embodiments of the present disclosure, model-based synthesis of audio data may be performed using by a speech model 1022 and a TTS front end 1016. The TTS front end 1016 may be the same as front ends used in traditional unit selection or parametric systems. In other embodiments, some or all of the components of the TTS front end 1016 are based on other trained models. The present disclosure is not, however, limited to any particular type of TTS front end 1016. The speech model 1022 may be used to synthesize speech without requiring the TTS unit storage 1072 or the TTS parametric storage 1080, as described in greater detail below.

TTS component receives text data 1010. Although the text data 1010 in FIG. 10 is input into the TTS component 180, it may be output by other component(s) (such as a skill 190, NLU component 160, NLG component 179 or other component) and may be intended for output by the system. Thus in certain instances text data 1010 may be referred to as "output text data." Further, the data 1010 may not necessarily be text, but may include other data (such as symbols, code, other data, etc.) that may reference text (such as an indicator of a word) that is to be synthesized. Thus data 1010 may come in a variety of forms. The TTS front end 1016 transforms the data 1010 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 1018. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1010, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 1016 may also process other input data 1015, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1010 and/or the text for a TTS request may be accompanied by separate metadata indicating what text should be whispered (or have some other indicated audio characteristic). The speech synthesis engine 1018 may compare the annotated phonetic units models and information stored in the TTS unit storage 1072 and/or TTS parametric storage 1080 for converting the input text into speech. The TTS front end 1016 and speech synthesis engine 1018 may include their own controller(s)/processor(s) and memory or they may use the controller/processor and memory of the server 120, device 110, or other device, for example. Similarly, the instructions for operating the TTS front end 1016 and speech synthesis engine 1018 may be located within the TTS component 180, within the memory and/or storage of the server 120, device 110, or within an external device.

Text data 1010 input into the TTS component 180 may be sent to the TTS front end 1016 for processing. The front end 1016 may include components for performing text normalization, linguistic analysis, linguistic prosody generation, or other such components. During text normalization, the TTS front end 1016 may first process the text input and generate standard text, converting such things as numbers, abbreviations (such as Apt., St., etc.), symbols ($, %, etc.) into the equivalent of written out words.

During linguistic analysis, the TTS front end 1016 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 180 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 1072. The linguistic analysis performed by the TTS front end 1016 may also identify different grammatical components such as prefixes, suffixes, phrases, punctuation, syntactic boundaries, or the like. Such grammatical components may be used by the TTS component 180 to craft a natural-sounding audio waveform output. The language dictionary may also include letter-to-sound rules and other tools that may be used to pronounce previously unidentified words or letter combinations that may be encountered by the TTS component 180. Generally, the more information included in the language dictionary, the higher quality the speech output.

Based on the linguistic analysis the TTS front end 1016 may then perform linguistic prosody generation where the phonetic units are annotated with desired prosodic characteristics, also called acoustic features, which indicate how the desired phonetic units are to be pronounced in the eventual output speech. During this stage the TTS front end 1016 may consider and incorporate any prosodic annotations that accompanied the text input to the TTS component 180. Such acoustic features may include syllable-level features, word-level features, emotion, speaker, accent, language, pitch, energy, duration, and the like. Application of acoustic features may be based on prosodic models available to the TTS component 180. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 1016, which may be referred to as a symbolic linguistic representation, may include a sequence of phonetic units annotated with prosodic characteristics. This symbolic linguistic representation may be sent to the speech synthesis engine 1018, which may also be known as a synthesizer, for conversion into an audio waveform of speech for output to an audio output device and eventually to a user. The speech synthesis engine 1018 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 1018 may perform speech synthesis using one or more different methods. In one method of synthesis called unit selection, described further below, a unit selection engine 1030 matches the symbolic linguistic representation created by the TTS front end 1016 against a database of recorded speech, such as a database (e.g., TTS unit storage 1072) storing information regarding one or more voice corpuses (e.g., voice inventories 1078a-n). Each voice inventory may correspond to various segments of audio that was recorded by a speaking human, such as a voice actor, where the segments are stored in an individual inventory 1078 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 1030 may then use the information about each unit to select units to be joined together to form the speech output.

The unit selection engine 1030 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 1020) to form output audio data 1090 representing synthesized speech. Using all the information in the unit database, a unit selection engine 1030 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 1032, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 1020) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 180 may be configured to perform TTS processing in multiple languages. For each language, the TTS component 180 may include specially configured data, instructions and/or components to synthesize speech in the desired language(s). To improve performance, the TTS component 180 may revise/update the contents of the TTS unit storage 1072 based on feedback of the results of TTS processing, thus enabling the TTS component 180 to improve speech synthesis.

The TTS unit storage 1072 may be customized for an individual user based on his/her individualized desired speech output. In particular, the speech unit stored in a unit database may be taken from input audio data of the user speaking. For example, to create the customized speech output of the system, the system may be configured with multiple voice inventories 1078a-1078n, where each unit database is configured with a different "voice" to match desired speech qualities. Such voice inventories may also be linked to user accounts. The voice selected by the TTS component 180 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 1078 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 1068) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 1030 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 1030. As part of unit selection, the unit selection engine 1030 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 1072 or in another storage component. For example, different unit selection databases may be stored in TTS unit storage 1072. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 1018 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 180 may include an acoustic model, or other models, which may convert a symbolic linguistic representation into a synthetic acoustic waveform of the text input based on audio signal manipulation. The acoustic model includes rules which may be used by the parametric synthesis engine 1032 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 1016.

The parametric synthesis engine 1032 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 1018, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 1032 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 1032 may lead to a number of potential audio output sequences. Based on the acoustic model and other potential models, the potential audio output sequences may be scored according to a confidence level of the parametric synthesis engine 1032. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 1068, which may represent acoustic settings matching a particular parametric "voice", may be used by the synthesis component 1020 to ultimately create the output audio data 1090.

When performing unit selection, after a unit is selected by the unit selection engine 1030, the audio data corresponding to the unit may be passed to the synthesis component 1020.

The synthesis component 1020 may then process the audio data of the unit to create modified audio data where the modified audio data reflects a desired audio quality. The synthesis component 1020 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 180. For each unit that corresponds to the selected portion, the synthesis component 1020 may process the audio data for that unit to create a modified unit audio data. The modified unit audio data may then be concatenated to form the output audio data 1090. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 180. In that case, other output data 1085 may be output along with the output audio data 1090 so that an ultimate playback device (e.g., device 110) receives instructions for playback that can assist in creating the desired output audio. Thus, the other output data 1085 may include instructions or other data indicating playback device settings (such as volume, playback rate, etc.) or other data indicating how output audio data including synthesized speech should be output. For example, for whispered speech, the output audio data 1090 may include other output data 1085 that may include a prosody tag or other indicator that instructs the device 110 to slow down the playback of the output audio data 1090, thus making the ultimate audio sound more like whispered speech, which is typically slower than normal speech. In another example, the other output data 1085 may include a volume tag that instructs the device 110 to output the speech at a volume level less than a current volume setting of the device 110, thus improving the quiet whisper effect.

Figure 11:
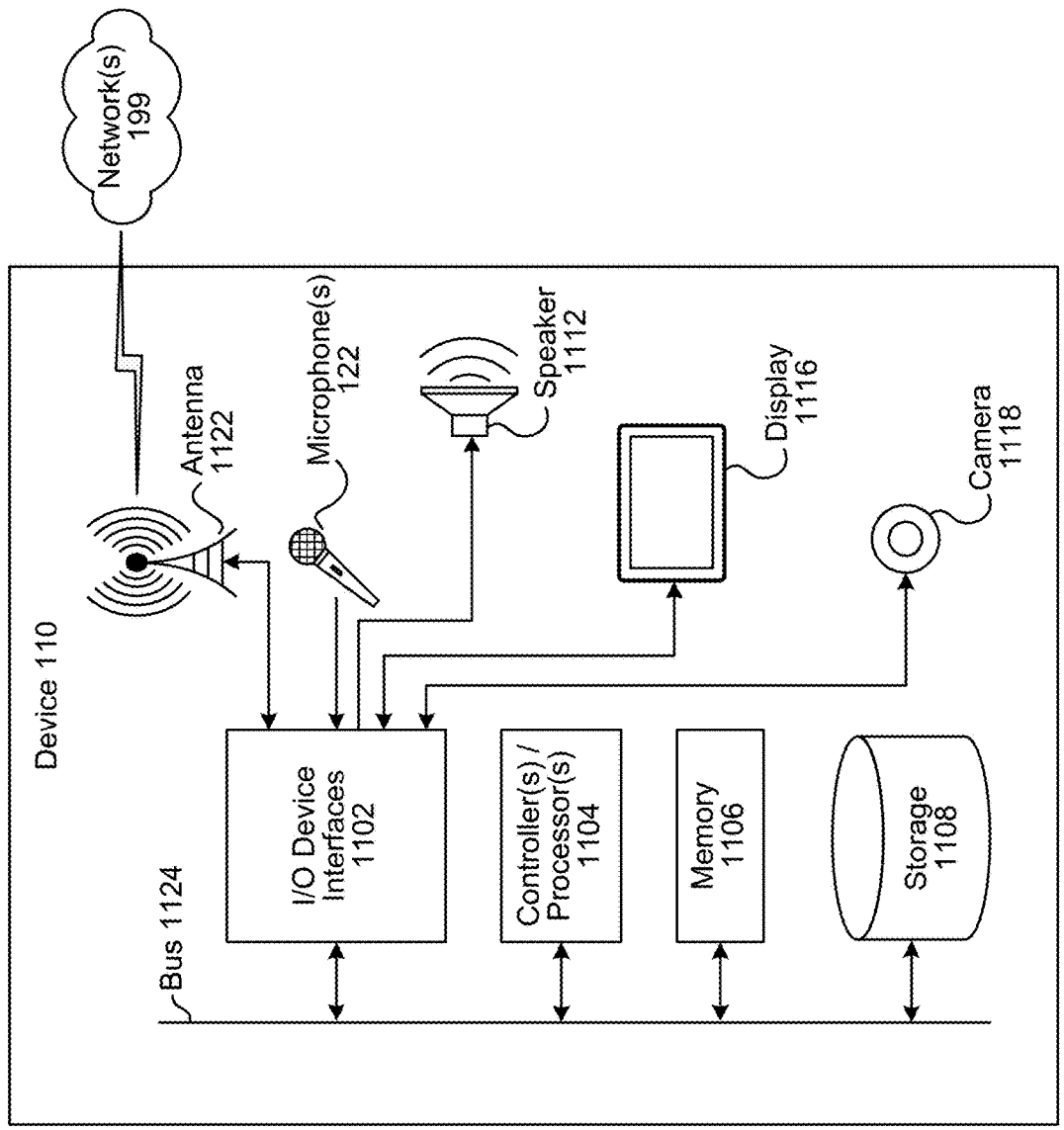
FIG. 11 is a block diagram conceptually illustrating example components of a device, according to embodiments of the present disclosure.
Figure 12:
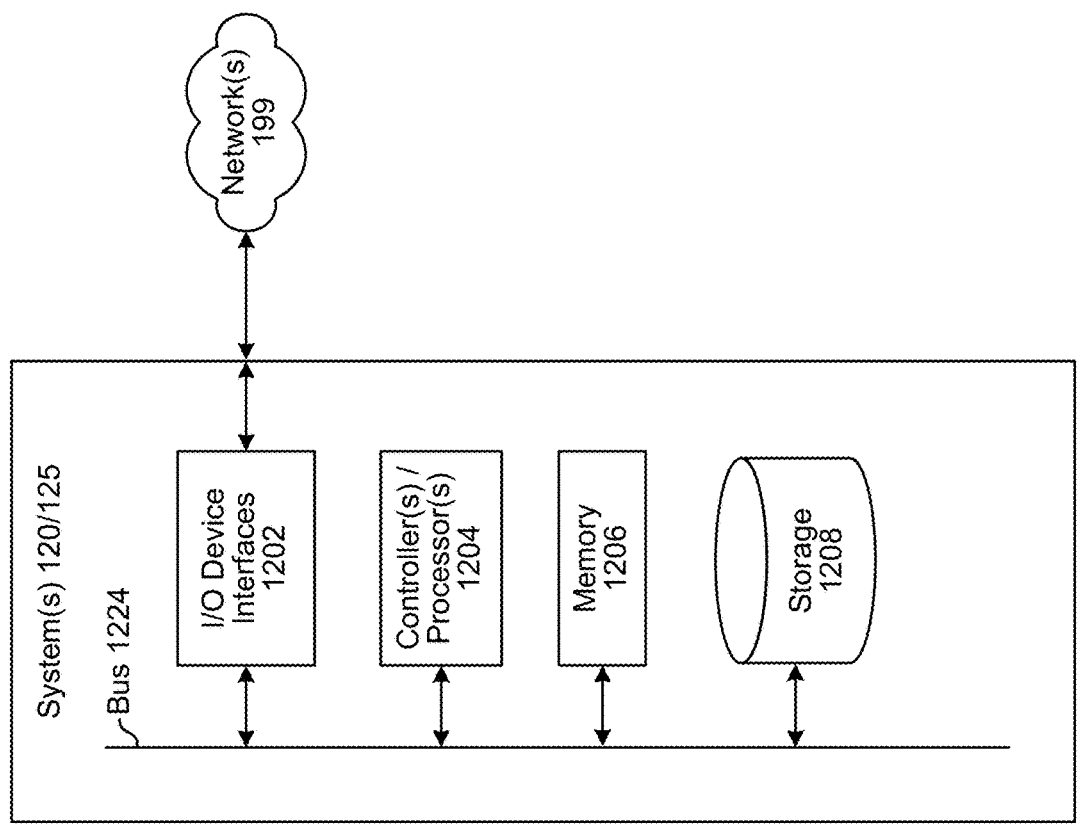
FIG. 12 is a block diagram conceptually illustrating example components of a system, according to embodiments of the present disclosure.

FIG. 11 is a block diagram conceptually illustrating a device 110 that may be used with the system. FIG. 12 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) he server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/125) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1102/1202).

Computer instructions for operating each device (110/120/125) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/125) includes input/output device interfaces (1102/1202). A variety of components may be connected through the input/output device interfaces (1102/1202), as will be discussed further below. Additionally, each device (110/120/125) may include an address/data bus (1124/1224) for conveying data among components of the respective device. Each component within a device (110/120/125) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 122 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1122, the input/output device interfaces 1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1102/1202), processor(s) (1104/1204), memory (1106/1206), and/or storage (1108/1208) of the device(s) 110, natural language command processing system 120, or the skill system 125, respectively. Thus, the ASR component 150 may have its own I/O interface(s), processor(s), memory, and/or storage; the NLU component 160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system. As can be appreciated, a number of components may exist either on a system 120 and/or on device 110. For example, language processing components 192 (which may include ASR 150), language output components 193 (which may include NLG 179 and TTS 180), etc., for example as illustrated in FIG. 1A. Unless expressly noted otherwise, the system version of such components may operate similarly to the device version of such components and thus the description of one version (e.g., the system version or the local version) applies to the description of the other version (e.g., the local version or system version) and vice-versa.

Figure 13:
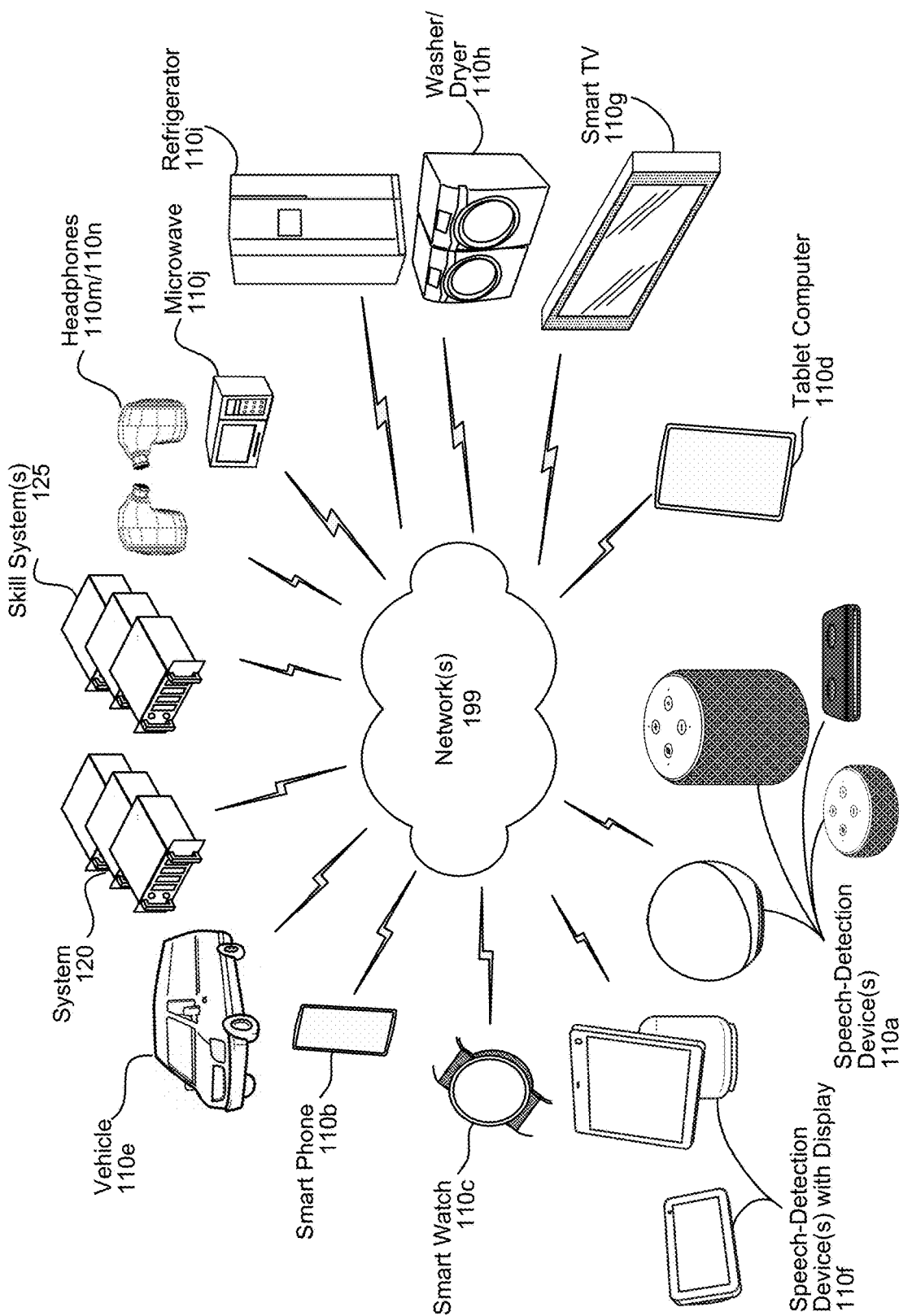
FIG. 13 illustrates an example of a computer network for use with the overall system, according to embodiments of the present disclosure.

As illustrated in FIG. 13, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device (e.g., a robot), etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 160, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
   receiving a plurality of audio frames representing audio captured by a device;
   determining a first subset of the plurality of audio frames;
   determining a second subset of the plurality of audio frames, wherein the second subset is different from the first subset but includes at least one audio frame from the first subset;
   processing, using a convolutional recurrent neural network encoder (CRNN) configured to determine audio features in the plurality of audio frames, the first subset to generate first hidden state data of the CRNN;
   determining preliminary embedding data using at least the first hidden state data;
   processing, using the CRNN, the second subset and the first hidden state data to generate second hidden state data of the CRNN;
   determining interim embedding data using the second hidden state data and the preliminary embedding data;
   determining, using at least the interim embedding data, final embedding data representing audio features representing the audio;
   processing the final embedding data with respect to stored data to determine results data, the stored data representing audio of an event; and
   determining, based at least in part on the results data, that an instance of the event has occurred.

2. The method of claim 1, further comprising:
   processing the first hidden state data using a first transformation to generate a preliminary variable value; and
   determining, using the first transformation, the preliminary variable value, and the second hidden state data, an interim variable value, wherein determining the interim embedding data additionally includes using the interim variable value.

3. The method of claim 2, wherein the first transformation includes:
   determining first data by performing a hyperbolic tangent function using the first hidden state data;
   determining second data by performing a softmax weighted summation using the first data, wherein determining the preliminary variable value additionally includes using the second data;
   determining third data by performing a hyperbolic tangent function using the second hidden state data; and
   determining fourth data by performing a softmax weighted summation using the third data, wherein determining the interim variable value additionally includes using the fourth data.

4. The method of claim 3, wherein:
   determining the interim embedding data includes adding the preliminary embedding data to a dot product of the fourth data and the second hidden state data; and
   determining the final embedding data includes dividing the interim embedding data by the interim variable value.

5. A method comprising:
   receiving a first portion of audio data;
   receiving a second portion of audio data;
   processing, using a recurrent neural network (RNN), the first portion of audio data to generate first data representing a first hidden state of the RNN;
   processing the first data to determining a first variable value;
   determining second data representing a first embedding using at least the first data;
   processing, using the RNN, the second portion of audio data and the first data to generate third data representing a second hidden state of the RNN;
   determining, using the third data, a second variable value;
   determining fourth data representing a second embedding using the third data, and the first embedding; and
   determining, using at least the fourth data and the second variable value, fifth data representing audio features representing the audio data.

6. The method of claim 5, wherein determining the fifth data includes normalizing the fourth data using the second variable value.

7. The method of claim 5, further comprising:
   determining sixth data by performing a hyperbolic tangent function using the first data;
   determining seventh data by performing a softmax weighted summation using the sixth data, wherein determining the first variable value additionally includes using the seventh data;
   determining eighth data by performing a hyperbolic tangent function using the third data; and
   determining ninth data by performing a softmax weighted summation using the eighth data, wherein determining the second variable value additionally includes using the ninth data.

8. The method of claim 7, further comprising:
   determining the fourth data includes adding the second data to a dot product of the ninth data and the third data.

9. The method of claim 5, wherein the RNN is a convolutional neural network configured to process frames of the audio data to determine audio features representing the audio data.

10. The method of claim 5, further comprising:
    analyzing the fifth data with respect to stored data to determine results data, the stored data representing audio of an event; and
    determining, based at least on the results data, that an event has occurred.

11. The method of claim 10, further comprising:
    receiving, by a first device, input audio;
    generating, based on the input audio, at least the first portion of audio data and the second portion of audio data; and
    in response to determining that the event has occured, causing a change of physical state of a second device different from the first device.

12. The method of claim 5, further comprising:
processing, using the RNN, a third portion of audio data and the third data to generate sixth data representing a third hidden state of the RNN; and
determining seventh data representing a third embedding using the sixth data and the fourth data, wherein determining the fifth data additionally includes using the seventh data.

13. A system, comprising:
at least one processor; and
at least one memory comprising instructions that, when executed by the at least one processor, cause the system to:
receive a first portion of audio data;
receive a second portion of audio data;
process, using a recurrent neural network (RNN), a first portion of audio data to generate first data representing a first hidden state of the RNN;
process the first data to determining a first variable value;
determine second data representing a first embedding using at least the first data;
process, using the RNN, the second portion of audio data and the first data to generate third data representing a second hidden state of the RNN;
determine, using the third data, a second variable value;
determine fourth data representing a second embedding using the third data and the first embedding; and
determine, using at least the fourth data and the second variable value, fifth data representing audio features representing the audio data.

14. The system of claim 13, wherein the at least one memory further includes instructions that, when executed by the at least one processor, further cause the system to determine the fifth data by normalizing the fourth data using the second variable value.

15. The system of claim 13, wherein the at least one memory further includes instructions that, when executed by the at least one processor, further cause the system to:
determine sixth data by performing a hyperbolic tangent function using the first data;
determine seventh data by performing a softmax weighted summation using the sixth data, wherein determining the first variable value additionally includes using the seventh data;
determine eighth data by performing a hyperbolic tangent function using the third data; and
determine ninth data by performing a softmax weighted summation using the eighth data, wherein determining the second variable value additionally includes using the ninth data.

16. The system of claim 15, wherein the at least one memory further includes instructions that, when executed by the at least one processor, further cause the system to:
determine the fourth data includes adding the second data to a dot product of the ninth data and the third data.

17. The system of claim 13, wherein the RNN is a convolutional neural network configured to process frames of the audio data to determine audio features representing the audio data.

18. The system of claim 13, wherein the at least one memory further includes instructions that, when executed by the at least one processor, further cause the system to:
analyze the fifth data with respect to stored data to determine results data, the stored data representing audio of an event; and
determine, based at least on the results data, that an event has occurred.

19. The system of claim 18, wherein the at least one memory further includes instructions that, when executed by the at least one processor, further cause the system to:
receive, by a first device, input audio;
generate, based on the input audio, at least the first portion of audio data and the second portion of audio data; and
in response to determining that the event has occurred, cause a change of physical state of a second device different from the first device.

20. The system of claim 13, wherein the at least one memory further includes instructions that, when executed by the at least one processor, further cause the system to:
process, using the RNN, a third portion of audio data and the third data to generate sixth data representing a third hidden state of the RNN; and
determine seventh data representing a third embedding using the sixth data and the fourth data, wherein determining the fifth data additionally includes using the seventh data.

\* \* \* \* \*